(12) United States Patent
Serizawa et al.

(10) Patent No.: US 10,306,339 B2
(45) Date of Patent: May 28, 2019

(54) LARGE-SCALE SENSOR NETWORK SYSTEM

(71) Applicant: HITACHI, LTD., Chiyoda-ku, Tokyo (JP)

(72) Inventors: Yasutaka Serizawa, Tokyo (JP); Ryosuke Fujiwara, Tokyo (JP); Masayuki Miyazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 106 days.

(21) Appl. No.: 15/322,359

(22) PCT Filed: Jul. 9, 2014

(86) PCT No.: PCT/JP2014/068247
§ 371 (c)(1),
(2) Date: Dec. 27, 2016

(87) PCT Pub. No.: WO2016/006048
PCT Pub. Date: Jan. 14, 2016

(65) Prior Publication Data
US 2017/0134833 A1 May 11, 2017

(51) Int. Cl.
*G01V 1/16* (2006.01)
*G01V 1/18* (2006.01)
(Continued)

(52) U.S. Cl.
CPC .............. *H04Q 9/00* (2013.01); *G01V 1/162* (2013.01); *G01V 1/22* (2013.01); *H02J 7/0047* (2013.01);
(Continued)

(58) Field of Classification Search
CPC ........ G01V 1/223; G01V 1/22; G01V 1/3808; G01V 1/00; G01V 1/003; G01V 1/24;
(Continued)

(56) References Cited

U.S. PATENT DOCUMENTS 8,335,128 B2 * 12/2012 Iseli .................. G01V 1/223
367/76
9,753,174 B2 * 9/2017 Maxwell ............... G01V 3/20
(Continued)

FOREIGN PATENT DOCUMENTS

JP 2001-187611 A 7/2001
JP 2007-097358 A 4/2007
(Continued)

OTHER PUBLICATIONS

Extended European search report dated Feb. 8, 2018 for European Patent Application No. 14897203.7.
(Continued)

*Primary Examiner* — Muhammad N Edun
*Assistant Examiner* — Jerold B Murphy
(74) *Attorney, Agent, or Firm* — Miles & Stockbridge P.C.

(57) ABSTRACT

It is necessary to increase the scale of a sensor network to achieve high resource exploration efficiency. On the other hand, since there are increasing needs to extend the area of an exploration region and to detect deeper geological stratum and crust structures more accurately, the large-scale sensor network needs to be operated for a long period of several weeks or longer. In order to solve the problem, a sensor unit needs to be turned on always to perform measurement always. However, an auxiliary measurement unit is activated intermittently since the auxiliary measurement unit needs to acquire data at necessary timings only. On the other hand, during collection and transmission of data and charging of a battery, a sensor terminal detects whether power is supplied from a data collection and charging device and automatically turns off the sensor unit and the auxiliary measurement unit to activate a data transmission unit. In this way, it is possible to ensure a long-term operation by
(Continued)

reducing the power consumption during acquisition of vibration data, improve operation efficiency by automatically switching an operation mode, and accelerate data transmission.

13 Claims, 17 Drawing Sheets

(51) Int. Cl.

| | | |
|---|---|---|
| G01V 1/22 | (2006.01) | |
| G01V 1/24 | (2006.01) | |
| G01V 1/26 | (2006.01) | |
| H04Q 9/00 | (2006.01) | |
| H04B 1/38 | (2015.01) | |
| H02J 7/00 | (2006.01) | |
| H02J 7/02 | (2016.01) | |
| H02J 50/12 | (2016.01) | |
| H02J 50/80 | (2016.01) | |
| G01D 21/00 | (2006.01) | |
| H04W 88/02 | (2009.01) | |

(52) U.S. Cl.
CPC .......... *H02J 7/0052* (2013.01); *H02J 7/0063* (2013.01); *H02J 7/025* (2013.01); *H02J 50/12* (2016.02); *H02J 50/80* (2016.02); *H04B 1/38* (2013.01); *G01D 21/00* (2013.01); *G01V 1/247* (2013.01); *H02J 2007/005* (2013.01); *H04Q 2209/88* (2013.01); *H04W 88/02* (2013.01)

(58) Field of Classification Search
CPC ..... G01V 1/3843; G01V 1/162; H02J 7/0031; H02J 50/80
See application file for complete search history.

(56) References Cited

U.S. PATENT DOCUMENTS

| | | | |
|---|---|---|---|
| 2006/0076934 A1* | 4/2006 | Ogata | H02J 7/0031 320/136 |
| 2008/0137484 A1 | 6/2008 | Scott | |
| 2010/0318298 A1* | 12/2010 | Golparian | G01C 15/00 702/14 |
| 2011/0098079 A1 | 4/2011 | Pennee et al. | |
| 2011/0158040 A1* | 6/2011 | Kooper | G01V 1/223 367/13 |
| 2015/0089089 A1* | 3/2015 | Holst | G01V 1/247 710/8 |

FOREIGN PATENT DOCUMENTS

| | | | |
|---|---|---|---|
| JP | 2009-514263 A | | 4/2009 |
| JP | 2010-050909 A | | 3/2010 |
| JP | 2010-166211 A | | 7/2010 |
| JP | 2012-134830 A | | 7/2012 |
| JP | 2013-011963 A | | 1/2013 |
| JP | 201311963 | * | 1/2013 |
| WO | WO 2007/049467 A1 | | 5/2007 |

OTHER PUBLICATIONS

Office Action dated Sep. 8, 2017 for related Japanese Application No. 2016-532828.

Savazzi, Stefano et al.; Ultra-Wide Band Sensor Networks in Oil and Gas Explorations; IEEE; Apr. 2013; pp. 150-160.

* cited by examiner

FIG. 15

| ILLUMINANCE [%] | SENSOR UNIT |
|---|---|
| 100 | OFF |
| 90 | OFF |
| 80 | OFF |
| 70 | OFF |
| 60 | OFF |
| 50 | OFF |
| 40 | OFF |
| 30 | ON |
| 20 | ON |
| 10 | ON |
| 0 | ON |

FIG. 21
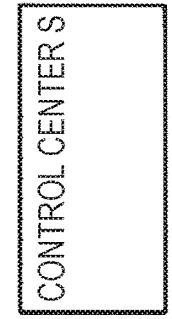
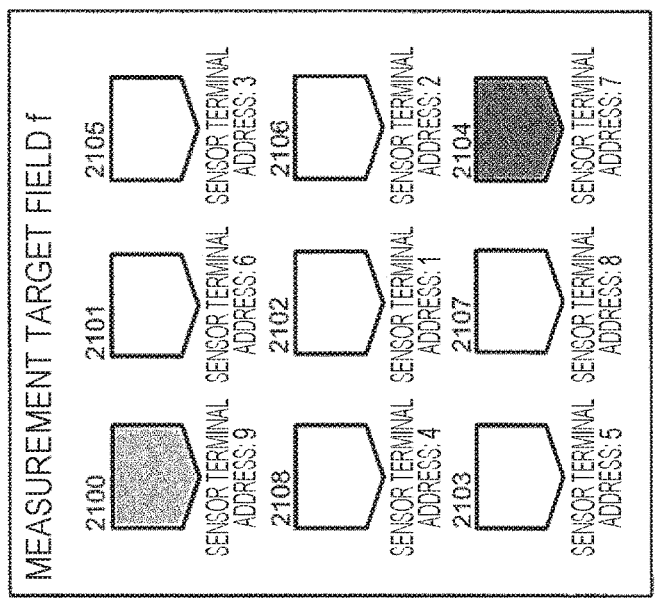
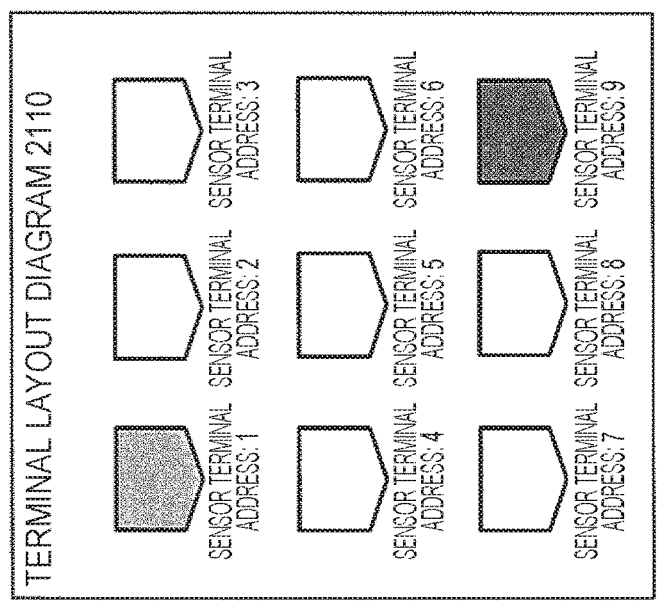

LARGE-SCALE SENSOR NETWORK SYSTEM

TECHNICAL FIELD

The present invention relates to a large-scale sensor network system, and particularly, to a method of collection, transmission, and management of data in a large-scale sensor network system.

BACKGROUND ART

In recent years, it has been an international issue how to cope with the increasing demands for natural resources. In the field of resource exploration, it has become important to efficiently find natural resources (petroleum, gas, and the like) in a short period and with high accuracy. On the other hand, with a decrease in productivity of major oil fields and a decrease in the number of oil fields which can be easily explored and developed, the place of resource exploration has become deeper and the competition for exploration development has become intensified. Thus, the need for providing a high-sensitivity exploration sensor technique at a low cost is increasing. From the perspective of achieving high sensitivity, instead of a conventional resource exploration system which uses geophones, an accelerometer which uses microelectromechanical systems (MEMS) sensors is gathering attention and various accelerometers have been developed. From the perspective view of achieving high resource exploration efficiency, a technique of shortening an exploration period by increasing the scale of a sensor network system has been discussed. In this technique, it is necessary to simplify the operation of the large-scale exploration system and to decrease the cost thereof. Since a conventional cable system has a limited system scale, the use of a cableless system has been discussed to reduce the number of operation steps.

Resource exploration uses various methods depending on the phase of exploration, and a seismic reflection exploration method is known as one of major methods used to finally specify the place where resources are buried. This method involves generating an artificial vibration from an artificial seismic source disposed on an earth surface with respect to a number of vibration sensors (acceleration sensors) arranged on the earth surface, allowing the vibration sensors to receive waves reflected from respective underground layers (a soil layer, a water layer, an oil and gas layer, a basement layer, and the like), and analyzing the waveform of the wave signal to detect a geological stratum structure and a geological crust structure under the exploration target earth surface. Dynamite may be used as the artificial seismic source, and a special vehicle called an earthquake simulation vehicle capable of generating an artificial seismic source may be used. When this method is used, an earthquake simulation vehicle as an artificial seismic source, a sensor network that acquires vibration data and transmits data, and a data center (a data collection vehicle) that stores the acquired data are to be placed in an exploration target field. As described above, the conventional sensor network is configured using a communication line and a power supply line. In the cable configuration, the number of sensors that perform measurement simultaneously is limited, the installation and design is restricted due to obstacles (forest, jungle, or the like) on the field, and field facilities such as a large-capacity power facility and a large-scale data center (data collection vehicle) are required, which are one of the causes that increase the cost.

SUMMARY OF INVENTION

Technical Problem

As described above, although it is necessary to increase the scale of the sensor network in order to realize high resource exploration efficiency, the number of sensors that perform measurement simultaneously is limited in the conventional cable sensor network configuration. Specifically, in a resource exploration system which collects data and supplies power using an existing cable system, approximately several to tens of thousands of sensors only are installed due to the installation costs of a storage vehicle that stores an enormous amount of data and a power supply facility. Moreover, the installation conditions are limited due to obstacles (forest, jungle, or the like) on the field. However, in view of the above-described background art, there is an increasing need to install a large-scale sensor network including several tens to hundreds of thousands or more of sensors on a field to improve the resource exploration efficiency. On the other hand, since there are increasing needs to extend the area of an exploration region and to detect deeper geological stratum and crust structures more accurately, the large-scale sensor network needs to be operated for a long period of several weeks or longer.

Since it is difficult for the cable system to further improve the resource exploration efficiency as described above, the use of a cableless resource exploration system has been discussed. Since the cableless system enables sensor terminals to be installed in a place where the sensor terminals cannot be installed in the cable system and eliminates the need of field facilities, it is possible to reduce the cost remarkably. However, the existing cableless resource exploration system employs a battery drive method, transmits data according to a wireless multi-hop method, and transmits data to a data center using installed sensor terminals according to a bucket brigade method. Due to this, since it is necessary to constantly turn on wireless modules of the sensor terminals during measurement, the cableless resource exploration system consumes a large amount of power and can be operated for approximately ten days only. Therefore, the cableless resource exploration system requires a low-power consumption system which enables a long period of operation with batteries. On the other hand, when the system is operated for a long period, a sensor data quantity per sensor terminal exceeds 10 GB, an entire large-scale sensor system needs to transmit and process data of several hundreds of TB or more in a day, and a method of wirelessly transmitting the large quantity of data to a data center is required. That is, a problem to be solved by the present invention is to realize a resource exploration system which can be operated with low power (long battery service life) and enables high-speed simultaneous data transmission.

Solution to Problem

In order to solve the problem, the present invention provides a resource exploration system which uses terminal data storage-type sensor terminals, in which vibration data sensed by the sensor terminal is always written to a memory in the terminal during a predetermined operation period rather than transmitting the data according to the conventional wireless multi-hop method. After a predetermined period of operation, the sensor terminal is stored in a data collection and charging device, and the data stored in the sensor terminal is automatically transmitted to the data collection and charging device via high-speed wireless communication upon detecting the storage of the sensor terminal in the data collection and charging device, and the data is transmitted to a data center using a cable communication line (LAN or the like) connected to the data collection and charging device. Moreover, a non-contact charging system is mounted, and the data collection and charging device automatically charges the battery in the sensor terminal upon detecting the storage of the sensor terminal. Here, the data collection and transmission device always turns on the non-contact charging function so that data transmission and charging can be started simultaneously with storage of the sensor terminal, and the sensor terminal starts high-speed data transmission using the start of charging as a trigger. Thus, the sensor terminal includes a sensor unit that acquires vibration data, a charging unit that performs a charging function, a data transmission unit that performs high-speed data communication, and an auxiliary measurement unit for acquiring auxiliary data for measuring the vibration data.

On the other hand, since the sensor terminal needs to operate with low power consumption in a vibration data measurement period, the sensor unit and the auxiliary measurement unit only necessary for measuring the vibration data are operated. The sensor unit needs to be turned on always to perform measurement always. However, the auxiliary measurement unit is activated intermittently since the auxiliary measurement unit needs to acquire data at necessary timings only. On the other hand, during collection and transmission of data and charging of a battery, the sensor terminal detects whether power is supplied from a data collection and charging device and automatically turns off the sensor unit and the auxiliary measurement unit to activate the data transmission unit. In this way, it is possible to ensure a long-term operation by reducing the power consumption during acquisition of vibration data, improve operation efficiency by automatically switching an operation mode, and accelerate data transmission. Since the charging unit (a non-contact charging circuit) of the sensor terminal is a passive circuit, the charging unit consumes no power in a state in which the sensor terminal is not stored in the data collection and charging device.

Advantageous Effects of Invention

According to the present invention, it is possible to provide a large-scale sensor network including several tens to several hundreds of thousands or more of sensor terminals, capable of ensuring a long-term operation by reducing the power consumption during acquisition of data, improving operation efficiency by automatically switching an operation mode, and accelerating data transmission. Moreover, since the large-scale sensor network is a cableless system (wireless power feeding and wireless data transmission) and the sensor terminal does not require a cable connector or the like, the large-scale sensor network can be easily designed to have robustness to environments (water and dust proofness).

BRIEF DESCRIPTION OF DRAWINGS

FIG. 15 is a diagram illustrating an example of a threshold illuminance that serves as a trigger of activation of a sensor unit and an auxiliary measurement unit in response to detection of illuminance.

FIG. 21 is a diagram illustrating an example of a field installation state before an RFID for notifying a control center of an alarm writes addresses when the remaining battery power of a sensor terminal of a sensor network is low or an operation defect occurs in a large-scale sensor network system of the present invention.

DESCRIPTION OF EMBODIMENTS

Hereinafter, embodiments of the present invention will be described with reference to the accompanying drawings.

Although it is assumed that the state transition flow of the embodiments of the present invention is implemented by software that runs on a general purpose computer including a microcomputer (or a processor) as will be described later, the state transition flow may be implemented by dedicated hardware or a combination of software and hardware.

Moreover, numerical values such as the number of sensor terminals installed, a communication speed, or an operation period are numerical values for description of embodiments and are not limited by the numerical values used in the following description.

Embodiment 1

<Schematic Configuration of Entire Large-Scale Sensor Network System>

Figure 1:
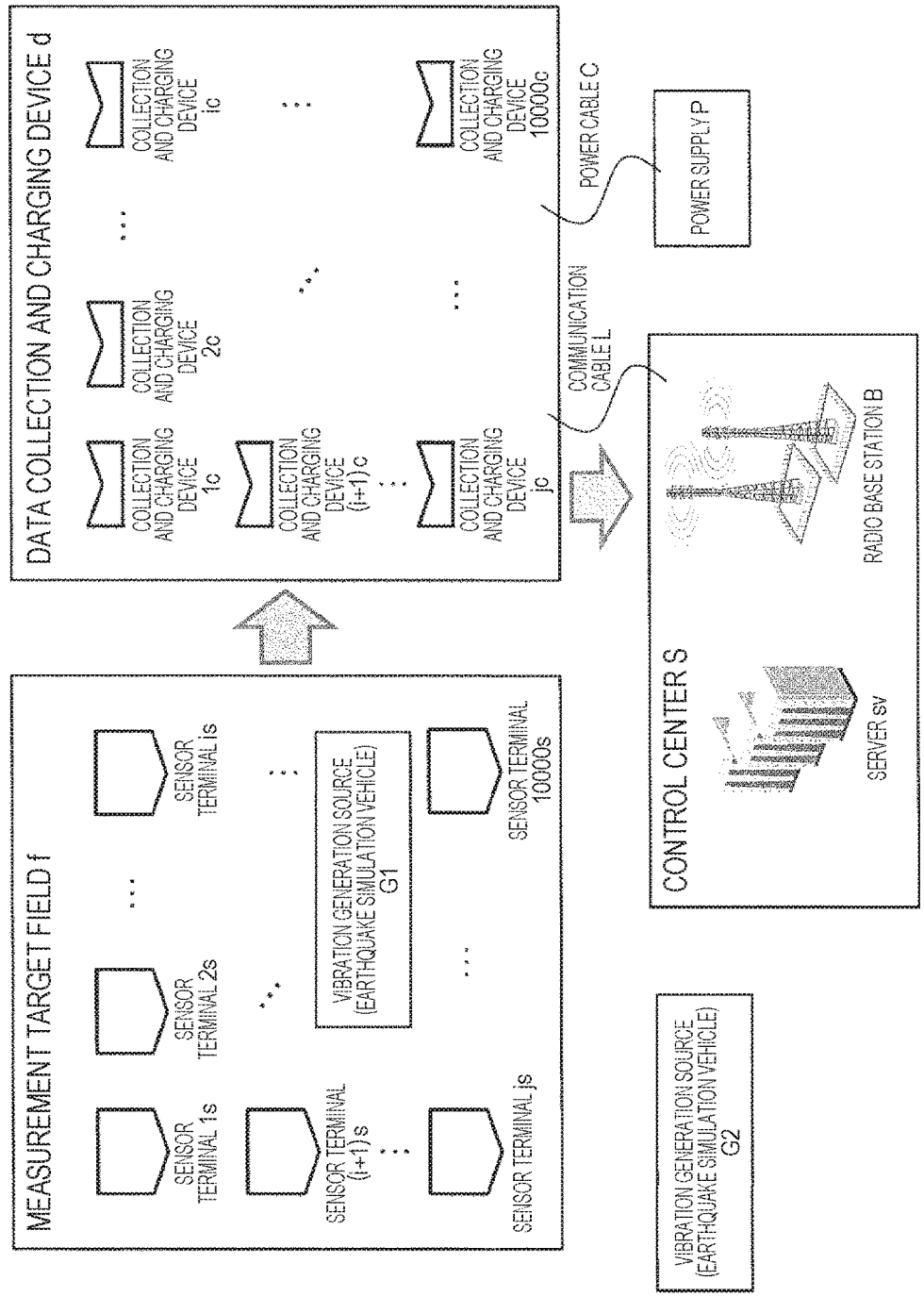
FIG. 1 is a diagram illustrating a schematic configuration example of an entire large-scale sensor network system of the present invention.

FIG. 1 is a diagram illustrating an overview of an entire large-scale sensor network system.

In the configuration example illustrated in FIG. 1, in a state in which one hundred thousand sensor terminals 1s to 10000s are disposed on a resource exploration and measurement target field f, a vibration generation source (an earthquake simulation vehicle) G generates an artificial vibration, and each sensor terminal observes seismic waves which are transmitted underground from the vibration generation source G and reflected by respective strata to arrive on the ground (or underground). A plurality of vibration generation sources (earthquake simulation vehicles) G are disposed on the field (G1 and G2), and generate vibration in a synchronized manner according to a base station control wireless command transmitted from a control center S via a radio base station B in some cases. When a long period of operation (measurement) ends, the sensor terminals 1s to 10000s storing vibration data acquired in the measurement target field f are transported to a data collection and charging facility d in which one hundred thousand collection and charging devices 1c to 10000c and the sensor terminals 1s to 10000s are stored in the collection and charging devices 1c to 10000c.

Figure 2:
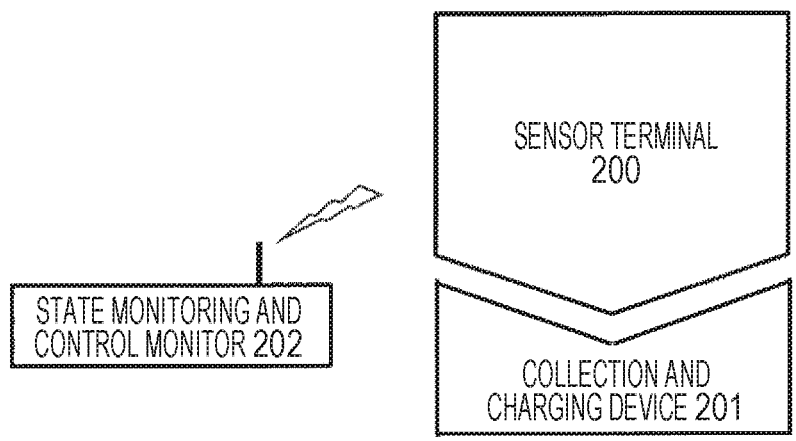
FIG. 2 is a diagram illustrating an example of an image in which a sensor terminal of the present invention is stored in a data collection and charging device.

FIG. 2 illustrates an example of an image in which a sensor terminal is stored in a data collection and charging device. A state monitoring and controlling monitor 202 is a monitor device in which a wireless module for accessing a control wireless device mounted on the sensor terminal 200 is mounted. The state monitoring and controlling monitor 202 can monitor the state of the sensor terminal 200 (instantaneous sensor value data, GPS data, temperature, notification of completion of data transmission, notification of completion of charging, and the like) via wireless communication and can issue various commands to the sensor terminal 200 and control the sensor terminal 200. Power is supplied from a power supply P to the data collection and charging device 201 via a power cable C. The data collection and charging facility d may be a data collection vehicle (a field truck) provided on the measurement target field f or may be a dedicated facility, for example. Moreover, the power supply P may be a power supply infrastructure of the data collection vehicle or the dedicated facility, a power generation system, a generator, or the like. When the sensor terminals 1s to 10000s are stored in the collection and charging devices 1c to 10000c, non-contact power feeding from each collection and charging device starts automatically, and the vibration data stored in the sensor terminal is wirelessly transmitted from the sensor terminal to the collection and charging device using the start of charging as a trigger. Here, examples of the non-contact charging method include an electromagnetic induction method represented by Qi standards and an electromagnetic field resonance method. Examples of the wireless transmission method include various specific low-power wireless systems including wireless LAN (WiFi), and millimeter radio communication. The vibration data collected by the data collection and charging device is transmitted from the data collection and charging facility d and stored in a server sv provided in the control center S using a communication cable L. When a data collection vehicle is used, the collection and charging device may be transported to the control center S by the collection vehicle and data may be transmitted by cables from the control center S to the server sv.

<Schematic Configuration of Sensor Terminal>

Figure 3:
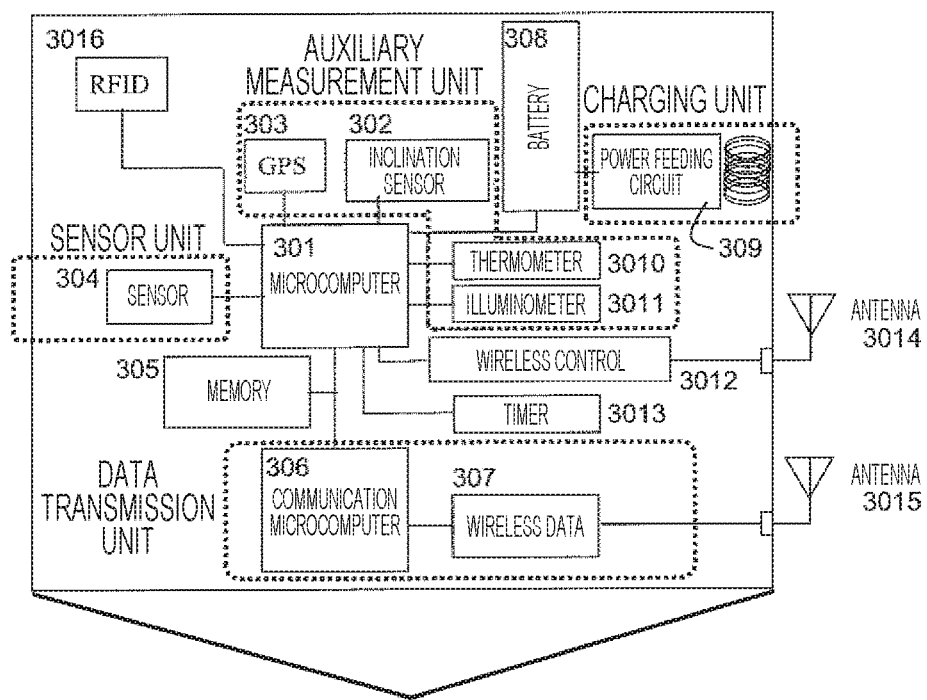
FIG. 3 is a diagram illustrating a schematic configuration example of a sensor terminal.

FIG. 3 illustrates an example of a configuration of a sensor terminal. This configuration example illustrates a configuration of a largest scale according to the present invention, and a partial configuration of the present configuration or another configuration which uses the partial configuration may be employed. The sensor terminal roughly includes a sensor unit, an auxiliary measurement unit, a data transmission unit, and a charging unit, and a microcomputer 301 controls the respective units according to a control program recorded therein to allow the state of the sensor terminal to transition. The sensor unit is configured as a sensor circuit 304. The sensor circuit 304 outputs a sensor value to the microcomputer 301 according to a sensor acquisition request from the microcomputer 301 and the microcomputer 301 stores the acquired sensor value in a memory 305. The auxiliary measurement unit includes a GPS 303 and an inclination sensor 302. The auxiliary measurement unit specifies an installation place of the sensor terminal using the GPS 303 and synchronizes the acquisition time points of the vibration data acquired by the large number of respective sensor terminals. The inclination sensor 302 measures an installation inclination of the sensor terminal to correct the vibration data. The data transmission unit includes a communication microcomputer 306 dedicated for high-speed data communication and a wireless data module 307. The charging unit is configured as a non-contact power feeding circuit 309. The power feeding circuit 309 is a passive circuit and is connected to a battery 308. Current flows through the power feeding circuit 309 to charge the battery 308 when the sensor terminal is stored in the data collection and charging device only. In addition, a thermometer 3010 and an illuminometer 3011 for detecting the state of the sensor terminal are mounted to detect the state of the sensor terminal from the outside via a wireless control module 3012. Moreover, the wireless control module 3012 can receive a wireless signal from the outside, transmit the signal to the microcomputer 201, convert a response from the microcomputer to a wireless packet, and transmit the wireless packet to the outside via an antenna 3014. In this way, the sensor terminal can be controlled from the outside. Moreover, when wireless controls cannot be realized due to an error in the wireless packet or the like, the state can be transitioned by a timer 3013 as a backup. Besides this, a wireless control antenna 3014, a wireless data antenna 3015, and an RFID circuit 3016 are provided.

<Schematic Configuration of Data Collection and Charging Device>

Figure 4:
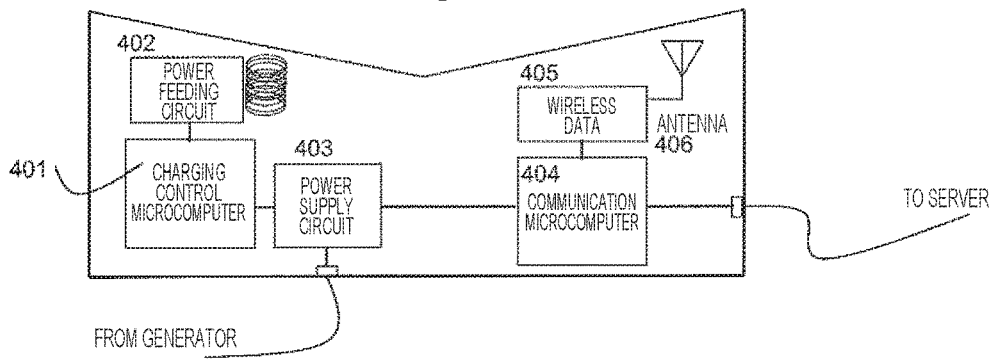
FIG. 4 is a diagram illustrating a schematic configuration example of a data collection and charging device.

FIG. 4 illustrates a configuration example of a data collection and charging device of the present invention. The data collection and charging device includes a charging system including a charge control microcomputer 401, a power feeding circuit 402, and a power supply circuit 403 and a data transmission system including a communication microcomputer 404, a wireless data module 405, and an antenna 406. When power to be fed to the sensor terminal is extracted from the power supply circuit 403 and the sensor terminal is stored by the control of the charge control microcomputer 401 controlling the power feeding circuit 402, charging starts. On the other hand, when charging of the sensor terminal starts, since the vibration data is wirelessly transmitted from the sensor terminal at a high speed, wireless waves are transmitted to the wireless data module 405 by the antenna 406 and converted to a digital signal by the wireless data module 405, and the vibration data is transmitted to the communication microcomputer 404. The communication microcomputer 404 transmits the received vibration data to the server via a communication cable (an optical fiber or a LAN cable) connected to the data collection and charging device.

<Basic State Transition Flow of Sensor Terminal>

Figure 5:
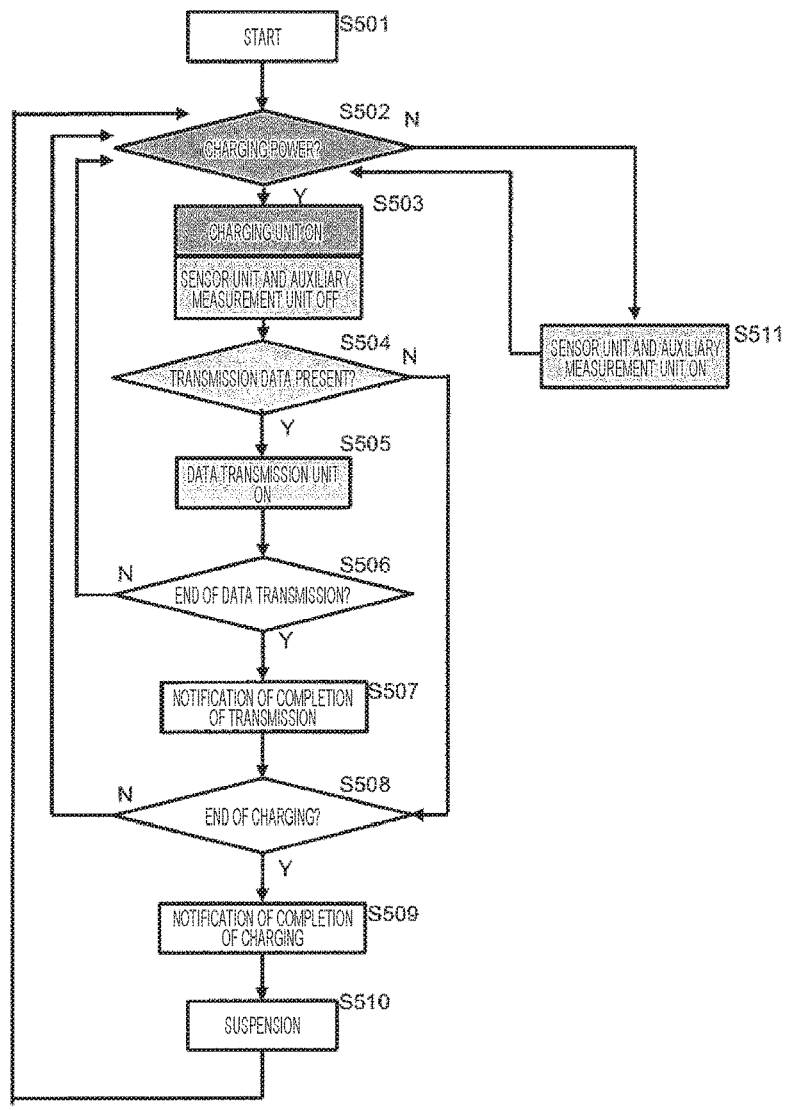
FIG. 5 is a diagram illustrating an example of a basic state transition flow of the sensor terminal of the present invention.

FIG. 5 illustrates a basic state transition flowchart of the sensor terminal. At the start (S501), the sensor terminal turns on the charge power reception circuit (the charging unit), the control signal reception circuit (the wireless control 3012), and the microcomputer 301 only and immediately checks whether power is supplied from the outside by a non-contact power feeding method (S502). When power is not supplied, the sensor unit and the auxiliary measurement unit are turned on (S511). When power is supplied, the charging unit is turned on and the sensor unit and the auxiliary measurement unit are turned off (S503). After that, it is checked whether data to be transmitted is present in the sensor terminal (S504), and the data transmission unit is turned on when the data is present (S505). When data transmission does not end, standby is performed until data transmission ends. When data transmission ends (S506), a notification of completion of transmission is sent to an external state monitoring and controlling monitor (203) using a wireless control (S507). Subsequently, standby is performed until charging ends (S508). When charging is completed, a notification of completion of charging is sent to the state monitoring and controlling monitor (203) using the wireless control (S508). After that, the sensor unit, the charging unit, and the data transmission unit are suspended (S510), and the state returns to the state during the start (activation). In this case, the charge power reception circuit (the charging unit), the control signal reception circuit (the wireless control), and the microcomputer 301 remain in the ON state.

Embodiment 2

Figure 6:
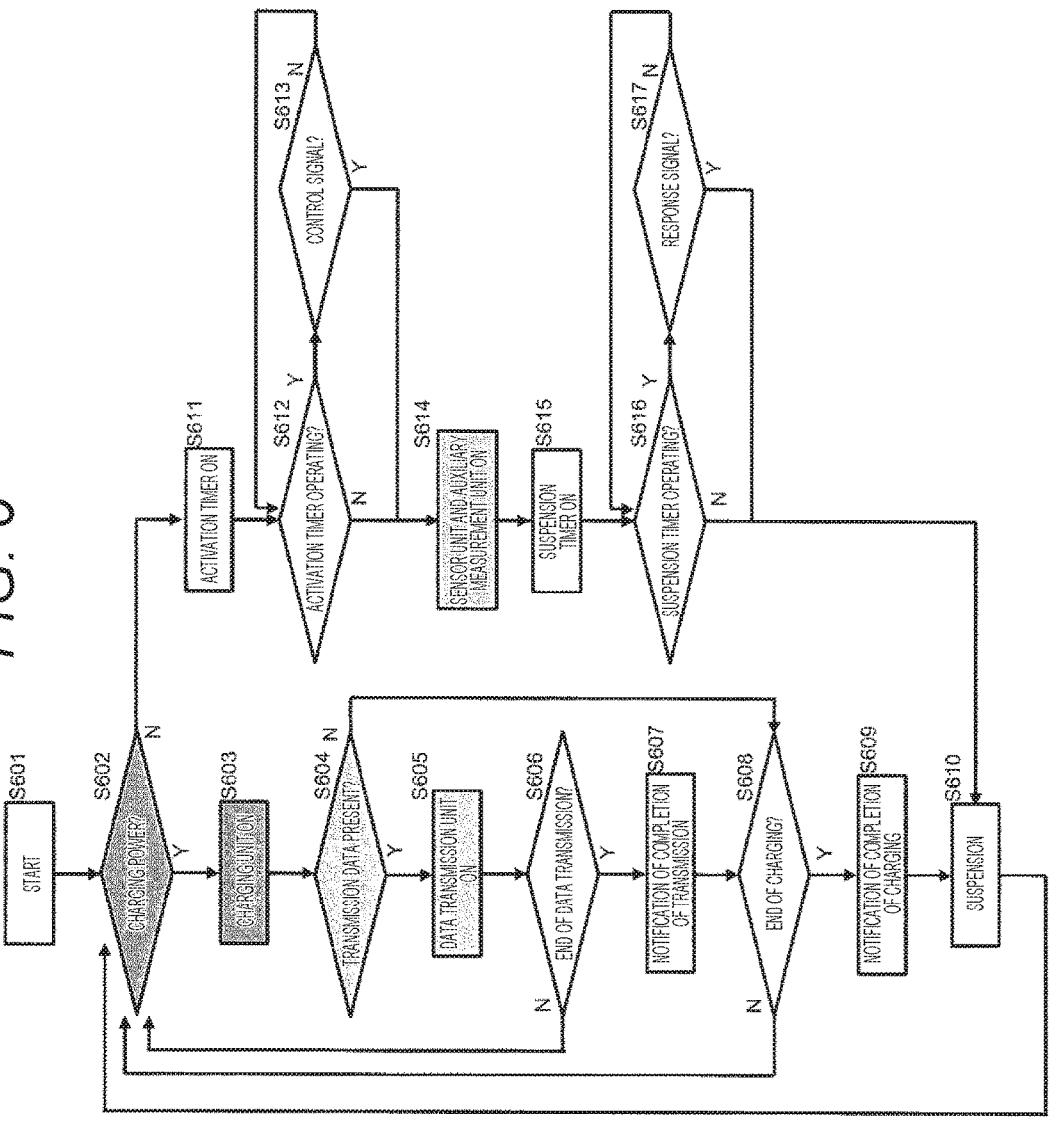
FIG. 6 is a diagram illustrating an example of a state transition flow of activation of a sensor unit and an auxiliary measurement unit in response to interception of an instruction signal of an earthquake simulation vehicle and suspension of the sensor unit and the auxiliary measurement unit in response to interception of a response signal in the sensor terminal of the present invention.
Figure 7:
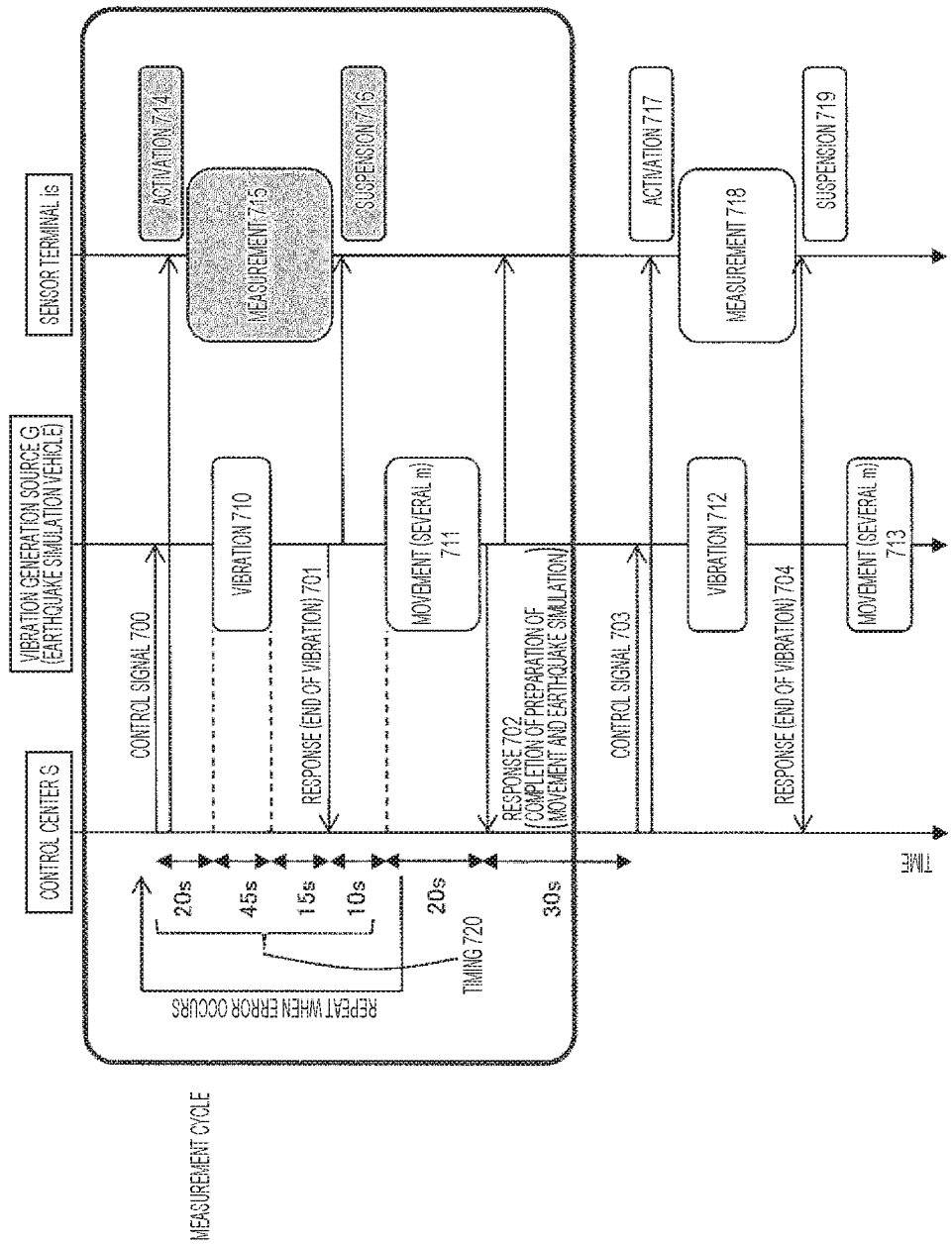
FIG. 7 is a diagram illustrating an example of a timing chart of activation of a sensor unit in response to an interception of an instruction signal of an earthquake simulation vehicle and suspension of the sensor unit in response to interception of a response signal in a large-scale sensor network system of the present invention.
Figure 8:
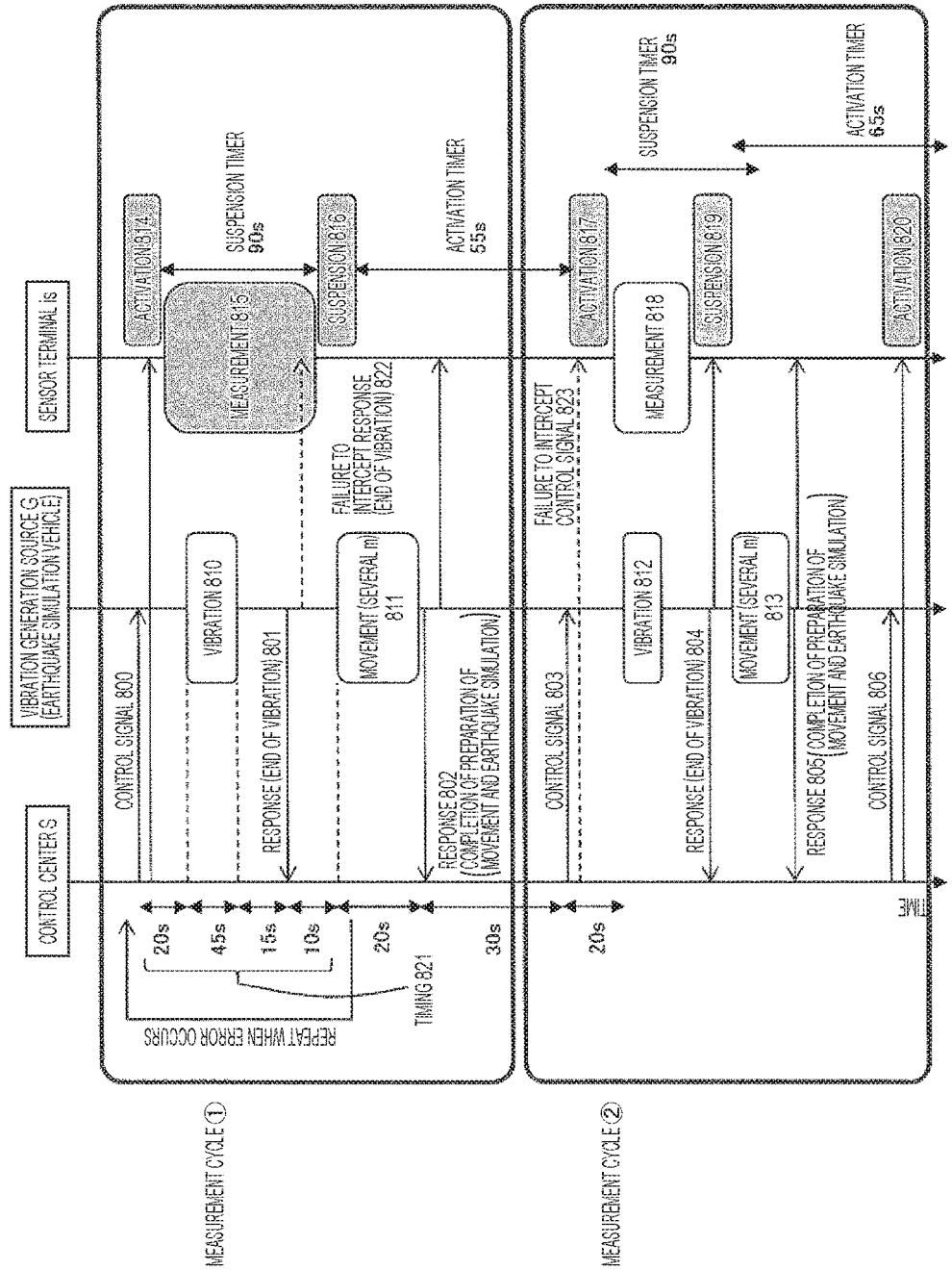
FIG. 8 is a diagram illustrating an example of a timing chart of activation of a sensor unit by a timer when it was not possible to intercept an instruction signal of an earthquake simulation vehicle and suspension of the sensor unit by the timer when it was not possible to intercept a response signal in the large-scale sensor network system of the present invention.

In Embodiment 2, a case in which the vibration generation source (the earthquake simulation vehicle) G generates an artificial vibration in response to receiving a control signal from the control center S, the vibration generation source (the earthquake simulation vehicle) G transmits a response signal to the control center S when a necessary artificial vibration is generated, the sensor terminal intercepts the control signal from the control center S and the response signal from the vibration generation source (the earthquake simulation vehicle) G, and the sensor unit and the auxiliary measurement unit of the sensor terminal are activated and suspended using the control signal and the response signal as triggers to suppress the operation of the sensor terminal (particularly, the sensor unit and the auxiliary measurement unit which are generally considered to consume a large amount of power) as much as possible to realize low power consumption will be described with reference to FIGS. 6 to 8.

<Sensor Terminal State Transition Flow>

FIG. 6 illustrates a state transition flow when the sensor unit and the auxiliary measurement unit of the sensor terminal are activated and suspended by intercepting the control signal and the response signal from the vibration generation source (the earthquake simulation vehicle). This flow starts from S601, and the flow when it is checked in S602 that charging power is supplied is substantially the same as that of Embodiment 1 (FIG. 5), and the description thereof will not be provided. The only difference is that the turning off of the sensor unit and the auxiliary measurement unit is omitted in S603 of turning the charging unit on. Although this process may be inserted, the process is omitted in the flowchart since the sensor unit and the auxiliary measurement unit are to be turned off when S603 of turning the charging unit on is performed.

When charging power is not present (S602: N), first, an activation timer is operated using the timer 3013. Subsequently, the sensor unit and the auxiliary measurement unit are turned on using an event which occurs earlier among an event indicating the end of countdown of the activation timer and an event indicating interception of the control signal from the control center to the vibration generation source (the earthquake simulation vehicle) G in S612 and S613 as a trigger (S614). Immediately after the sensor unit and the auxiliary measurement unit are turned on, a suspension timer is activated using the timer 3013 (S615). After the suspension timer is activated, the sensor unit and the auxiliary measurement unit are suspended using an event which occurs earlier among an event indicating the end of countdown of the suspension timer and an event indicating interception of the response signal from the vibration generation source (the earthquake simulation vehicle) G to the control center S in S616 and S617 as a trigger (S610). In the suspended state S610, the sensor terminal allows the charge power reception circuit (the charging unit), the control signal reception circuit (the wireless control 3012), the microcomputer 301, and the timer 3013 to remain in the ON state.

<Timing Chart (1)>

FIG. 7 illustrates a timing chart of the control center S, the vibration generation source (the earthquake simulation vehicle) G, and the sensor terminal is when the sensor unit and the auxiliary measurement unit of the sensor terminal are activated and suspended by intercepting the control signal and the response signal from the vibration generation source (the earthquake simulation vehicle). The control center S transmits a control signal 700 including information on a vibration pattern, a timing 720, and the like to the vibration generation source (the earthquake simulation vehicle) G disposed on the field. Upon intercepting the control signal from the control center S, the sensor terminal is activates 714 the sensor unit and the auxiliary measurement unit and immediately transitions to a measurement state 715. The vibration generation source (the earthquake simulation vehicle) G receives the control signal from the control center and generates a vibration 710 for 45 seconds after the elapse of 20 seconds in the example of FIG. 7. When the vibration ends, the vibration generation source (the earthquake simulation vehicle) G transmits a response (end of vibration) 701 to the control center S after the elapse of a predetermined period (15 seconds in the example of FIG. 7) and moves 711 to a subsequent vibration point after the elapse of 10 seconds. The control center S having received the response (end of vibration) 701 transitions to a standby state to receive a response (completion of preparation of movement and earthquake simulation) 702 from the vibration generation source (the earthquake simulation vehicle) G. On the other hand, the sensor terminal having intercepted the response (end of vibration) 701 from the vibration generation source (the earthquake simulation vehicle) G suspends 716 the sensor unit and the auxiliary measurement unit and allows the charge power reception circuit (the charging unit), the control signal reception circuit (the wireless control 3012), the microcomputer 301, and the timer 3013 to remain in the ON state. The vibration generation source (the earthquake simulation vehicle) G transmits a response (completion of preparation of movement and earthquake simulation) 702 to the control center S in a stage where preparation of movement and earthquake simulation is completed, and the control center having received the response 702 transmits a control signal 703 to the vibration generation source (the earthquake simulation vehicle) G after the elapse of a predetermined period (30 seconds in FIG. 7). After that, this sequence is repeated. When an error message is included in the response (end of vibration) 701 from the vibration generation source (the earthquake simulation vehicle) G, the vibration generation source (the earthquake simulation vehicle) G cancels the movement 711 and the control center repeats the sequence from the step of transmitting the control signal 700.

<Timing Chart (2)>

The timing chart illustrated in FIG. 8 illustrates a case in which the sensor terminal 1s is activated and suspended by the timer 3013 included in the sensor terminal, and the timer 3013 is used as a state transition backup means when the sensor terminal is cannot intercept the control signal of the control center S and the response signal of the vibration generation source (the earthquake simulation vehicle) G. In measurement cycle (1), the suspension timer is operated (for 90 seconds in FIG. 8) after activation of the sensor terminal is, and the sensor terminal transitions to a standby state to receive the response (end of vibration) 801 from the vibration generation source (the earthquake simulation vehicle) G. In this state, the sensor terminal transitions to a suspended state 816 (in which the charge power reception circuit (the charging unit), the control signal reception circuit (the wireless control 3012), the microcomputer 301, and the timer 3013 remain in the ON state) using interception of the response (end of vibration) 801 from the vibration generation source (the earthquake simulation vehicle) G or the end of countdown of the suspension timer as a trigger while performing measurement 815. Since the sensor terminal has failed in interception as indicated by failure in response (end of vibration) 822 interception in FIG. 8, the sensor terminal succeeds in transitioning to the suspended state 816 by the countdown (90 seconds) of the backed-up timer. Immediately after transitioning to the suspended state 816, the sensor terminal operates the activation timer (for 55 seconds in FIG. 8) and at the same time, performs standby to receive the control signal 803 of the control center S. In measurement cycle (2), due to failure in control signal interception 823, the sensor terminal 1s is activated 817 by the activation timer set to 55 seconds and immediately operates the suspension timer (90 seconds). However, during the measurement 818, since the sensor terminal has received a response (end of vibration) from the vibration generation source (the earthquake simulation vehicle) G before the end of countdown of the suspension timer, the sensor terminal transitions to the suspended state 819. Further, although the activation timer (65 seconds) was operated immediately after the suspended state 819, since the sensor terminal has intercepted the control signal 806 before the end of countdown of the activation timer, the sensor terminal is activated 820 according to the control signal 806. The timer values of the activation timer and the suspension timer used by the sensor terminal is are calculated by the control center based on the timing information 821 transmitted from the control center S to the vibration generation source (the earthquake simulation vehicle) G and are included in the control signals (800, 803) and are notified to the sensor terminal is. When the sensor terminal is was unable to receive the control signals (800, 803), the latest received timer value is used.

Embodiment 3

Figure 9:
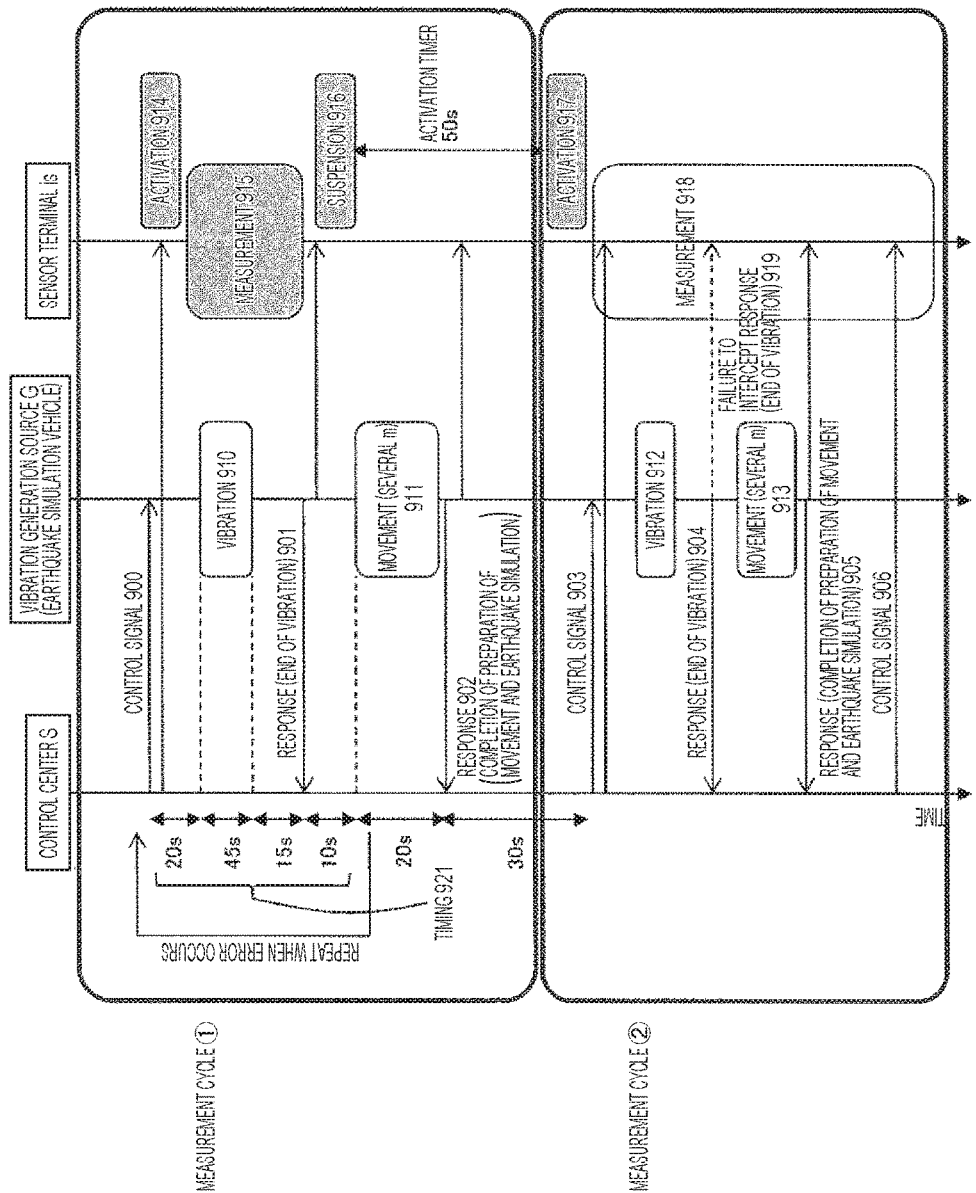
FIG. 9 is a diagram illustrating an example of a timing chart of suspension of a sensor unit in response to interception of a response signal of an earthquake simulation vehicle in the large-scale sensor network system of the present invention.
Figure 10:
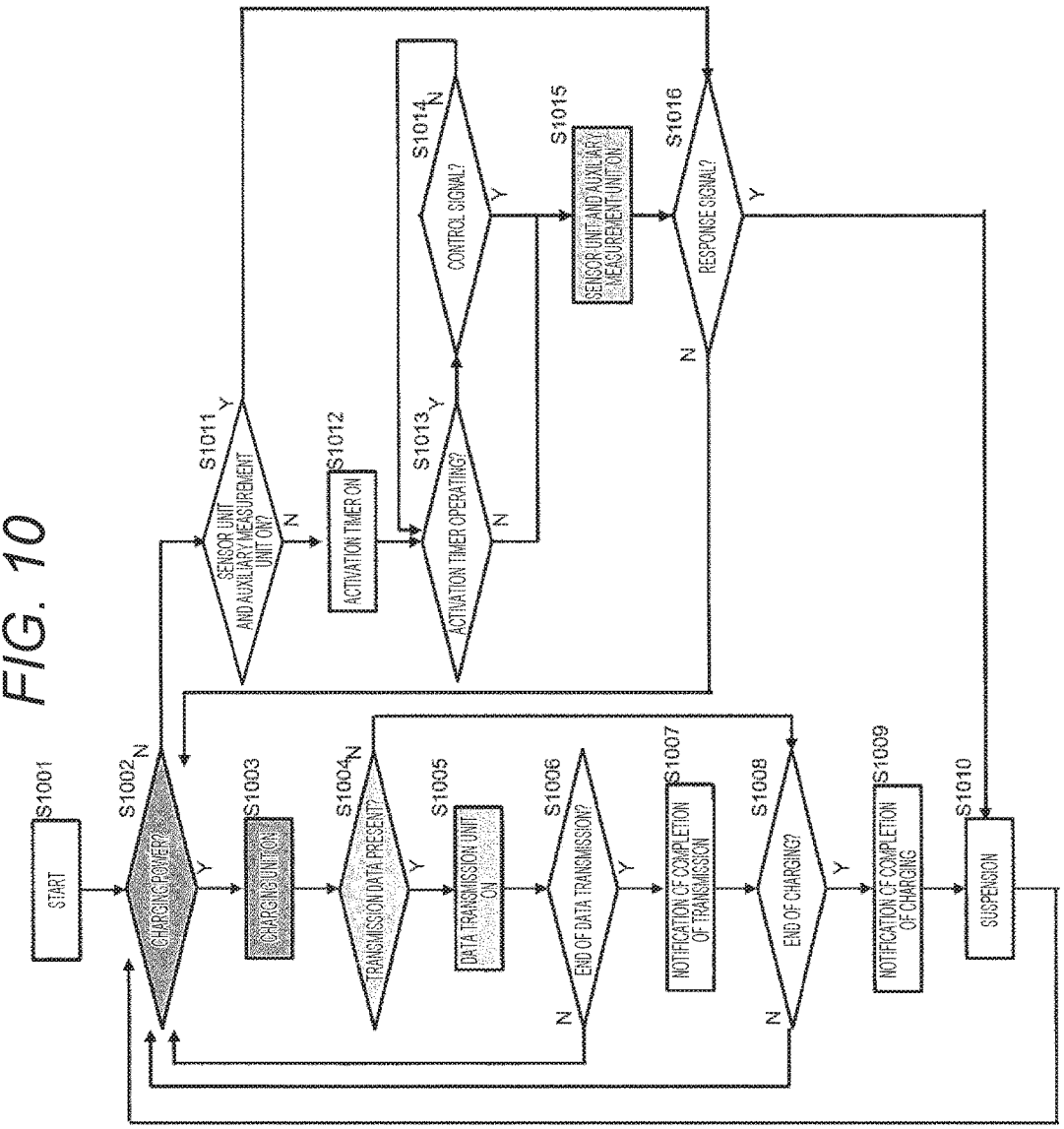
FIG. 10 is a diagram illustrating an example of a state transition flow of suspension of a sensor unit and an auxiliary measurement unit in response to interception of a response signal of an earthquake simulation vehicle in the sensor terminal of the present invention.

In Embodiment 3, a case in which the vibration generation source (the earthquake simulation vehicle) G generates an artificial vibration in response to receiving a control signal from the control center S, the vibration generation source (the earthquake simulation vehicle) G transmits a response signal to the control center S when a necessary artificial vibration is generated, the sensor terminal intercepts the response signal from the vibration generation source (the earthquake simulation vehicle) G, and the sensor unit and the auxiliary measurement unit of the sensor terminal are activated and suspended using the response signal as a trigger to suppress the operation of the sensor terminal (particularly, the sensor unit and the auxiliary measurement unit which are generally considered to consume a large amount of power) as much as possible to realize low power consumption will be described with reference to FIGS. 9 and 10. In Embodiment 2, the control signal is used as an activation trigger and the response signal is used as a suspension trigger. In this embodiment, even when it failed to receive the response signal, since the sensor terminal is always in the measurement mode unless the trigger of the response signal is present, it is possible to suppress the influence on the measurement operation as much as possible while suppressing power consumption. Therefore, this operation method is suitable for an environment (jungle or the like) in which the sensor terminal cannot easily intercept the control signal and the response signal.

\<Timing Chart\>

In the timing chart illustrated in FIG. 9, in measurement cycle (1), the sensor terminal 1s is activated 914 upon receiving a control signal 900 from the control center S and performs measurement 915. Since the sensor terminal has received a response (end of vibration) 901 from the vibration generation source (the earthquake simulation vehicle) G, the sensor terminal is suspended 916, operates the activation timer (50 seconds) and is activated 917 again after the elapse of 50 seconds. In measurement cycle (2), although the sensor terminal performs measurement 918, since the control signal from the control center S is received during the measurement 918, the control signal is ignored. On the other hand, since the sensor terminal is has failed to intercept 919 a response (end of vibration) 904 of the vibration generation source (the earthquake simulation vehicle) G, measurement is continued until the sensor terminal succeeds in interception of the response (end of vibration) of the vibration generation source (the earthquake simulation vehicle) G in a subsequent measurement cycle. The timer values of the activation timer and the suspension timer used by the sensor terminal is are calculated by the control center based on the timing information 921 transmitted from the control center S to the vibration generation source (the earthquake simulation vehicle) G and are included in the control signals (900, 903) and are notified to the sensor terminal is. When the sensor terminal is was unable to receive the control signals (900, 903), the latest received timer value is used.

\<Sensor Terminal State Transition Flow\>

FIG. 10 illustrates a state transition flow of the sensor terminal is in the present embodiment. The flow of S1001 to S1010 is the same as the flow of Embodiment 1 and the redundant description thereof will not be provided. When this flow starts (S1001), it is checked whether charging power is supplied (S1002). When the charging power is not supplied (N), the ON state of the sensor unit and the auxiliary measurement unit is checked. When the sensor unit and the auxiliary measurement unit are turn on, checking (S1016) of the response signal (end of vibration) from the vibration generation source (the earthquake simulation vehicle) G and checking (S1002) of charging power are repeated. When the response signal is present, the sensor unit and the auxiliary measurement unit are suspended (the charge power reception circuit (the charging unit), the control signal reception circuit (the wireless control 3012), the microcomputer 301, and the timer 3013 remain in the ON state) (S1010). On the other hand, when it is determined in S1011 that the sensor unit and the auxiliary measurement unit are in the OFF state, the activation timer is turned on and the sensor unit and the auxiliary measurement unit are turned on (S1015) using the end of countdown of the activation timer or the reception of the control signal as a trigger in S1012, S1013, and S1014, and the flow proceeds to S1016 to check the response signal (end of vibration).

Embodiment 4

In Embodiment 4, a method of activating the sensor terminal (the sensor unit) using various trigger signals described later rather than activating the same according to wireless signals transmitted from the control center S and the vibration generation source (the earthquake simulation vehicle) G will be described.

\<Sensor Terminal State Transition Flow\>

Figure 11:
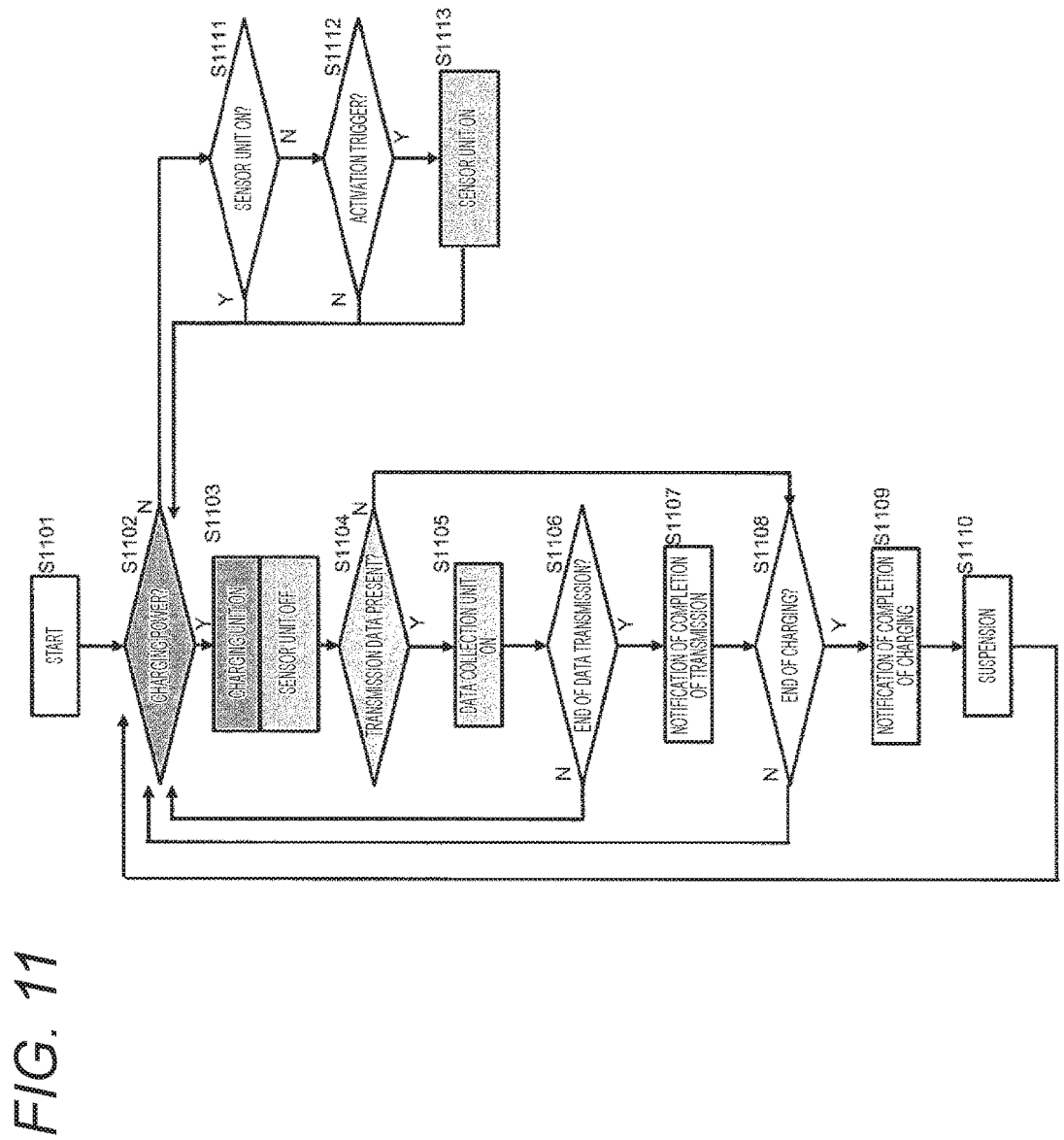
FIG. 11 is a diagram illustrating an example of a state transition flow of activation of a sensor unit and an auxiliary measurement unit in response to an activation trigger signal from a control device in the sensor terminal of the present invention.

FIG. 11 illustrates a state transition flow of a sensor terminal according to the present embodiment. The flow of S1101 to S1110 is the same as the flow of the above-described embodiment and the redundant description thereof will not be provided. Although a wireless control circuit, an auxiliary measurement unit or a thermometer/illuminometer, and a power feeding circuit only are turned on during the start (S1101) and the suspension (S1110), only a minimum necessary number of constituent elements (only a portion of the auxiliary measurement unit or the like) maybe turned on depending on the situation. After the start (S1101), it is checked whether charging power is supplied (S1002). When the charging power is not supplied (N), the ON state of the sensor unit is checked (S1111). When the sensor unit is in the ON state, it is checked whether the charging power is supplied (S1102). When the sensor unit is in the OFF state, it is checked whether an activation trigger is present (S1112). When the trigger is present, the sensor unit is turned on (S1113). When the trigger is not present, the flow returns to S1102 to check whether charging power is supplied. Hereinafter, the type of activation trigger used in S1112 will be described.

\<Activation Based on Wireless Signal of State Monitoring and Controlling Monitor 202\>

After the sensor terminal 1s is installed on a field, the sensor unit and the auxiliary measurement unit are turned on by the wireless control interface 3012 of the sensor terminal is using a wireless control function mounted on the state monitoring and controlling monitor 202 such as a handy control PC and a tablet PC.

\<Activation Based on Vibration Pattern\>

Figure 12:
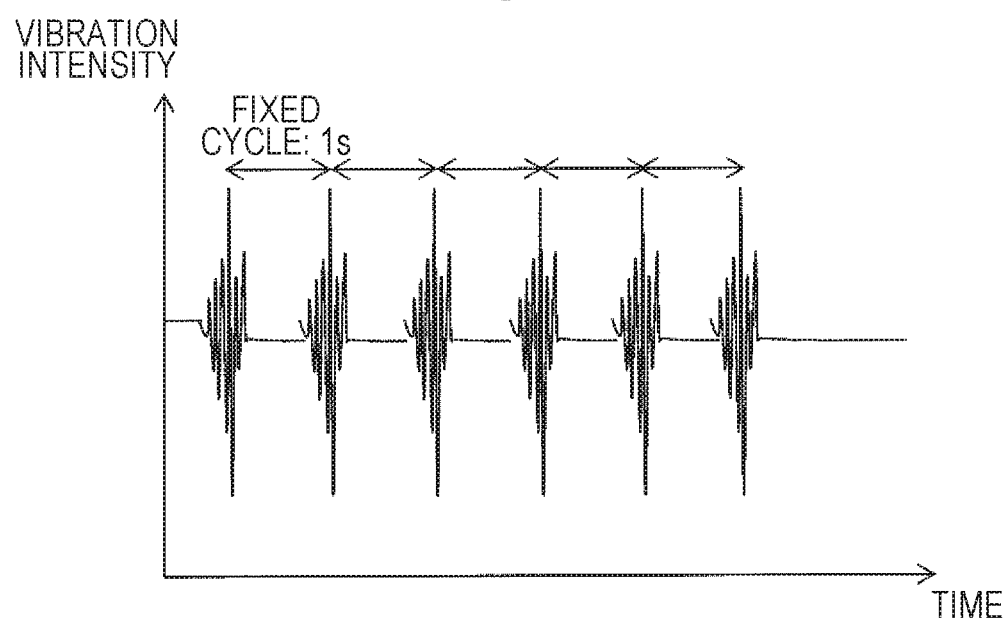
FIG. 12 is a diagram illustrating an example of a vibration pattern that serves as a trigger of activation of a sensor unit and an auxiliary measurement unit in response to a vibration pattern.

FIG. 12 illustrates an example of a vibration data pattern. A constant vibration pattern is generated to activate the sensor terminal is by the control of the vibration generation source (the earthquake simulation vehicle) G, an activation vibration pattern is determined using the auxiliary measurement unit (the inclination sensor 302) which can operate with low power consumption within the sensor terminal, and the microcomputer 301 determines whether the activation vibration pattern matches an activation vibration pattern stored in the memory 305. The sensor unit is activated when the patterns match each other. In the example of FIG. 12, it is assumed that the sensor unit is turned on when a vibration having the cycle of 1 second is observed six times as an example.

\<Activation Based on Detection of Impact\>

Figure 13:
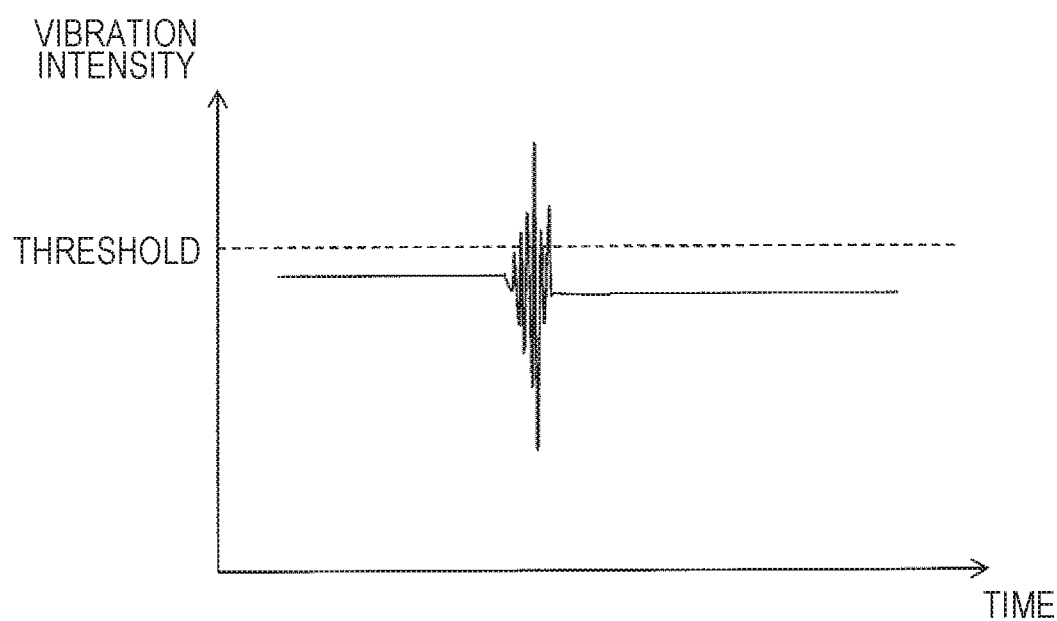
FIG. 13 is a diagram illustrating an example of a vibration pattern that serves as a trigger of activation of a sensor unit and an auxiliary measurement unit in response to detection of an impact and an example of a threshold set thereto.

An impact vibration may be used as an activation trigger. In actual field installation operations, the sensor terminal may be installed on the ground surface using a tool like a hammer. In this case, a threshold is set to vibration intensity as in FIG. 13, and the sensor unit is turned on when a vibration that exceeds the threshold is observed by the inclination sensor 302 of the auxiliary measurement unit.

\<Activation Based on Detection of Vibration Direction\>

Figure 14:
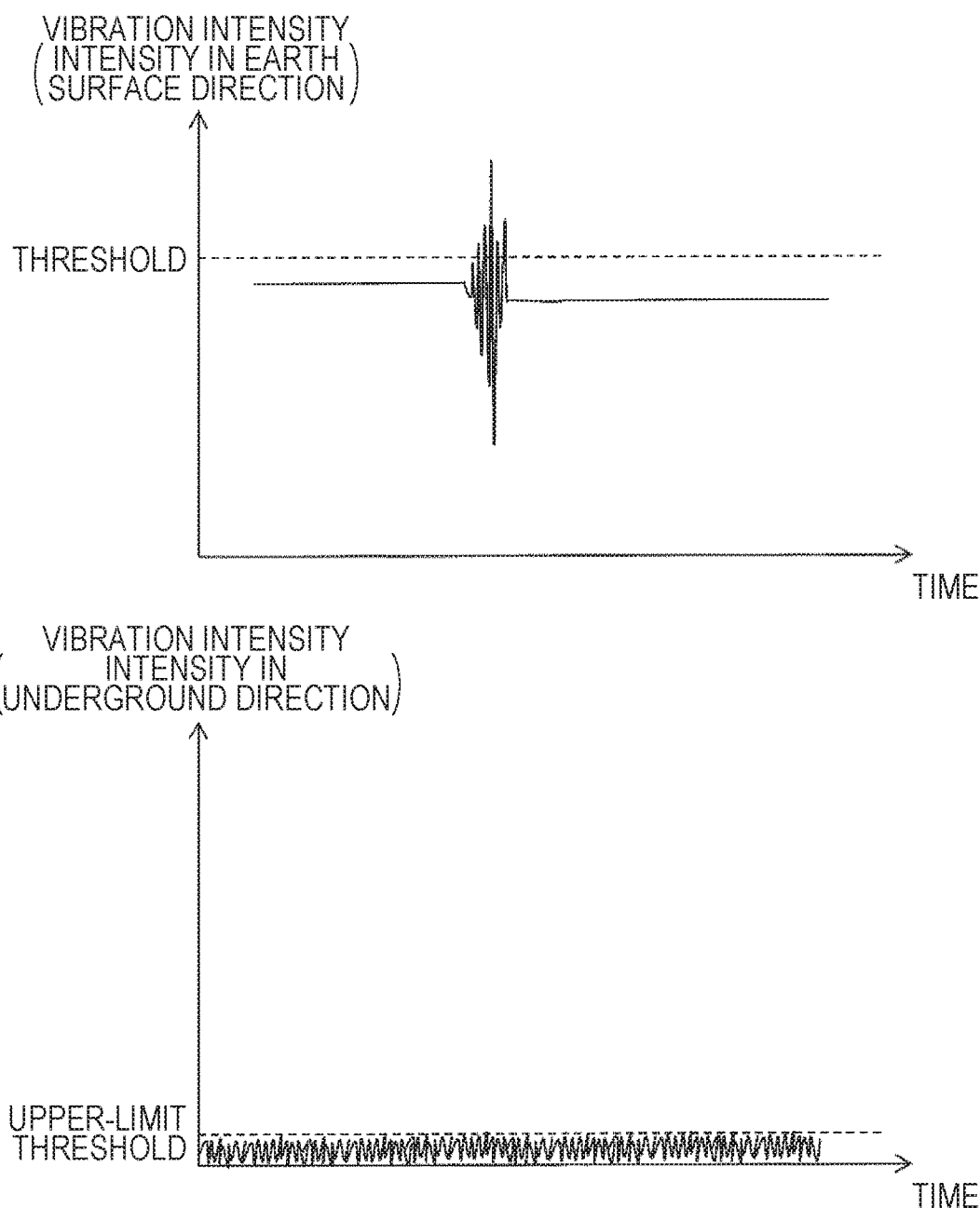
FIG. 14 is a diagram illustrating an example of a vibration pattern that serves as a trigger of activation of a sensor unit and an auxiliary measurement unit in response to detection of a vibration direction and an example of a threshold set thereto.

Since the vibration generation source (the earthquake simulation vehicle) G is installed on an earth surface, an initial vibration propagates through the earth surface. Due to this, it is considered that a component in the earth surface direction is dominant in the initial vibration from the vibration generation source (the earthquake simulation vehicle) G. Therefore, when the initial vibration is observed using a three-axis inclination sensor, the vibration intensity in the earth surface direction (two axes) exceeds a threshold as in the upper diagram of FIG. 14, and the vibration intensity in the underground direction is small as in the lower diagram in FIG. 14, it is determined that the observed vibration is the initial vibration component of the vibration generation source (the earthquake simulation vehicle) G, and the sensor unit is turned on.

\<Activation Based on Detection of Illuminance\>

When the illuminometer 3011 is mounted on the sensor terminal, and the illuminance is equal to or smaller than a predetermined threshold (30%) as in FIG. 15, it is determined that the sensor terminal is buried in the underground and that a state in which vibration can be measured is created, and the sensor unit is turned on.

<Activation Based on GPS Measurement Value>

Figure 16:
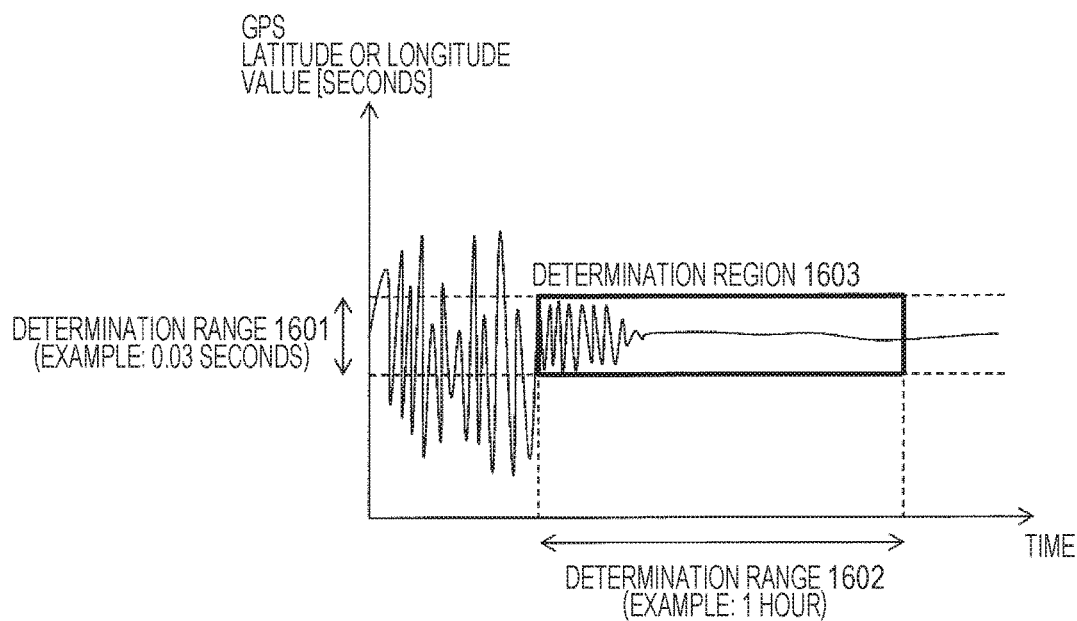
FIG. 16 is a diagram illustrating an example of a GPS measurement value that serves as a trigger of activation of a sensor unit and an auxiliary measurement unit in response to detection of a GPS measurement value and an example of a determination region set thereto.

When the GPS sensor value (latitude and longitude) obtained by the GPS module 303 of the auxiliary measurement unit falls within a predetermined range in a predetermined period, the sensor unit is activated. The fact that the sensor value falls within a predetermined range in a predetermined period means that the sensor terminal is arrived at an exploration field and was installed on the field. When it is not possible to acquire the GPS sensor value, the sensor unit is not activated and is accommodated in a metallic case during transportation or is transported using a truck in a sealed state. In this way, an erroneous activation of the sensor unit during transportation or the like can be avoided. FIG. 16 illustrates an example of data that serves as a trigger of activation based on a GPS measurement value. In the example of FIG. 16, the GPS sets a determination range 1601 to 0.03 seconds (approximately 1 m) using the values of latitude and longitude. A determination range 1602 in the time direction is set to 1 hour. When the GPS data falls within a determination region 1603, it is determined that the sensor terminal is installed at an expected measurement position of the field, and the sensor terminal activates the sensor unit.

<Activation Based on Detection of Temperature>

Figure 17:
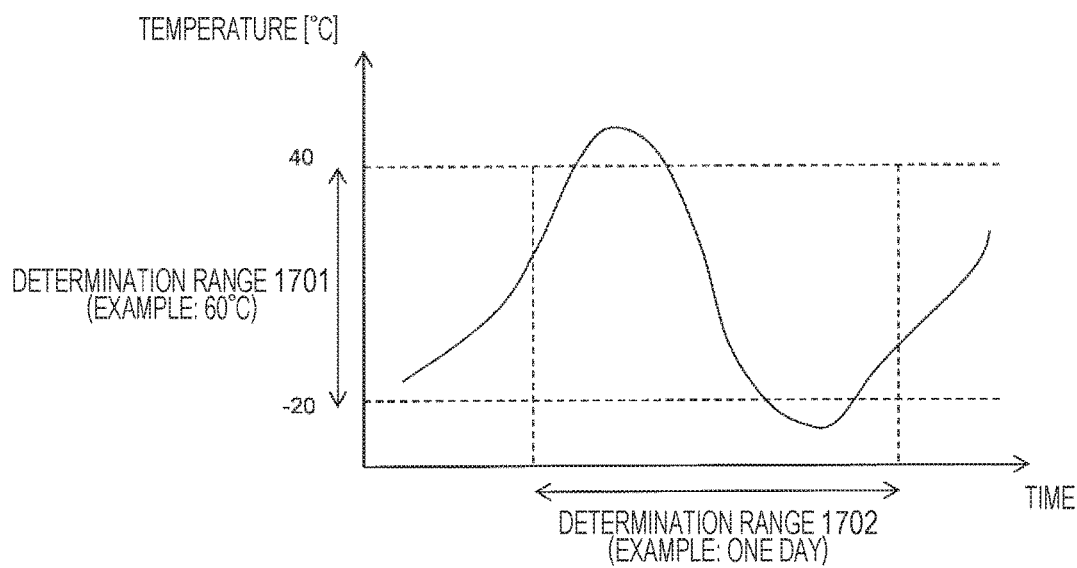
FIG. 17 is a diagram illustrating a temperature change pattern that serves as a trigger of activation of a sensor unit and an auxiliary measurement unit in response to detection of a temperature difference and an example of a determination temperature range set thereto.

As illustrated in FIG. 17, when the temperature measured by the thermometer 3010 of the sensor terminal exceeds a determination temperature range 1701 (for example, 60° C.) in a determination time range 1702 (for example, one day), the sensor unit is activated. According to the weather condition of an exploration field, it is determined whether a daily temperature difference is equal to or larger than a predetermined value. For example, it is easy to determine since the daily temperature difference is large in such a field as a desert.

Embodiment 5

In Embodiment 5, the wireless control method described in Embodiments 1 to 4 will be described in detail. Although the sensor terminal includes the wireless control interface 3012, the power consumption thereof increases if the sensor terminal is always activated to receive wireless signals from the control center S, the vibration generation source (the earthquake simulation vehicle) G, and the state monitoring and controlling monitor 202. Due to this, the sensor terminal needs to perform an intermittent operation according to an example of such a protocol as illustrated in FIG. 18.

Figure 18:
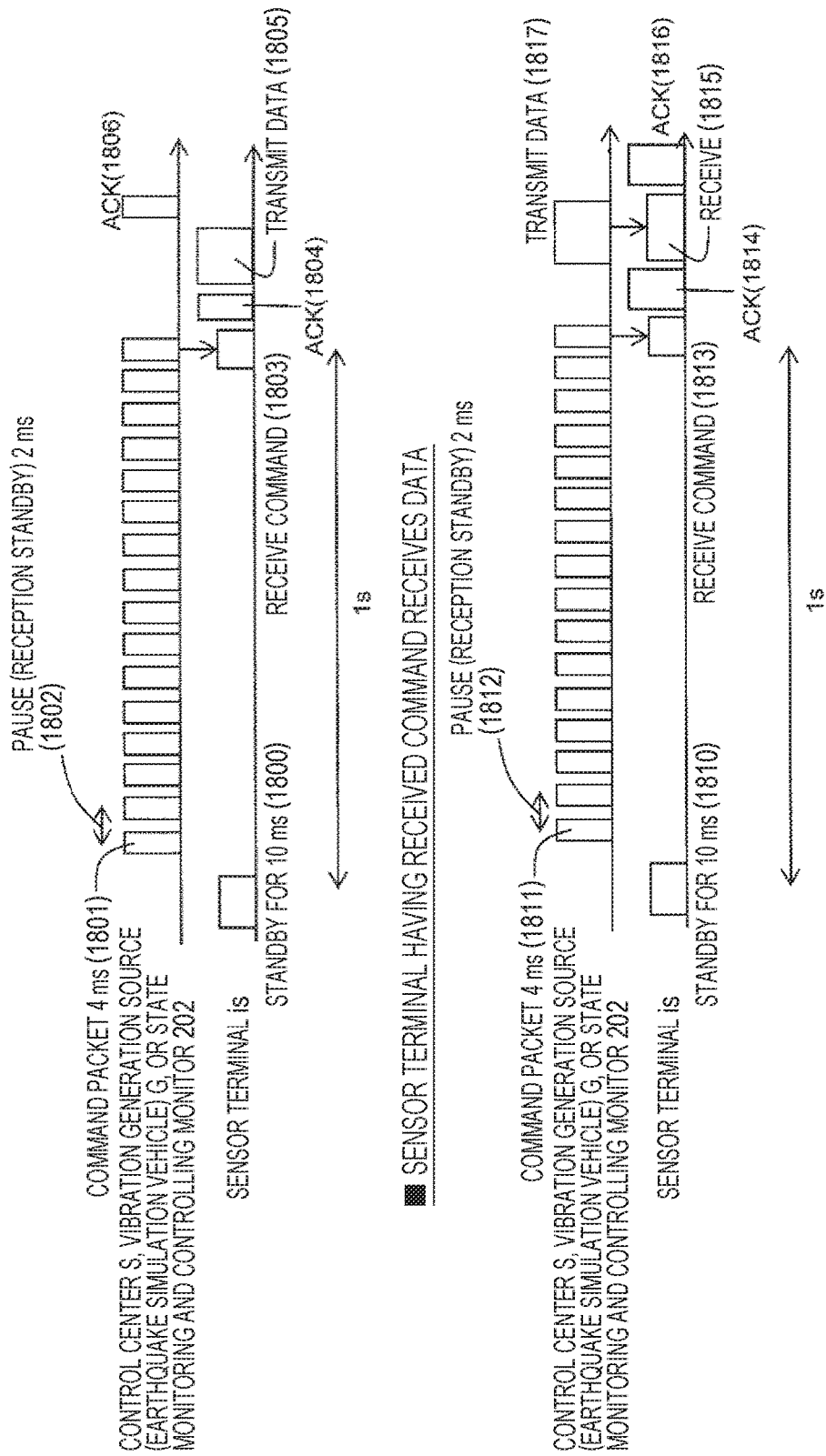
FIG. 18 is a communication timing diagram of an intermittent operation required for wireless control.

The upper diagram in FIG. 18 illustrates a protocol in which a command is wirelessly issued from the control center S, the vibration generation source (the earthquake simulation vehicle) G, and the state monitoring and controlling monitor 202 to the sensor terminal and the sensor terminal returns data in response to the command. Since it is assumed that a power supply is secured for the control center S, the vibration generation source (the earthquake simulation vehicle) G, and the state monitoring and controlling monitor 202, these devices continuously issue a command packet 1801 intermittently with a predetermined pause (standby) period 1802 (2 milliseconds). Since the sensor terminal is operates with a battery, the sensor terminal performs standby 1800 for 10 milliseconds in every second. When the transmission timing of the command packet 1801 transmitted intermittently overlaps the reception standby timing of the sensor terminal, the sensor terminal can receive the command (1803). Upon receiving the command, the sensor terminal immediately returns Ack (Acknowledgement) 1804 and immediately transmits data 1805. The control center S, the vibration generation source (the earthquake simulation vehicle) G, and the state monitoring and controlling monitor 202 enter into a reception standby mode upon receiving the Ack 1804 from the sensor terminal and return Ack upon receiving the transmitted data 1805 from the sensor terminal.

The lower diagram in FIG. 18 illustrates a protocol in which the sensor terminal is receives data in response to a command issued from the control center S, the vibration generation source (the earthquake simulation vehicle) G, and the state monitoring and controlling monitor 202. The control center S, the vibration generation source (the earthquake simulation vehicle) G, and the state monitoring and controlling monitor 202 continuously transmits a command packet 1811 intermittently and the sensor terminal receives the command (1813) when it was possible to transmit the command packet 1811 simultaneously with the reception standby mode of the sensor terminal is. Upon receiving the command (1813), the sensor terminal immediately returns Ack (1814) and enters into a reception standby mode (1815). Upon receiving the Ack (1814), the control center S, the vibration generation source (the earthquake simulation vehicle) G, and the state monitoring and controlling monitor 202 immediately transmit data. In this way, transmission of data to the sensor terminal is from the control center S, the vibration generation source (the earthquake simulation vehicle) G, and the state monitoring and controlling monitor 202 is completed, and the sensor terminal is returns Ack.

Embodiment 6

Figure 19:
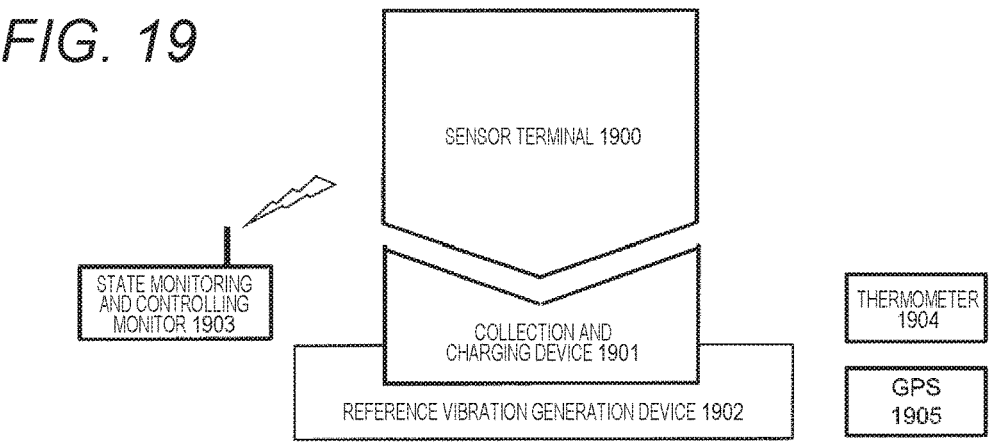
FIG. 19 is a diagram illustrating a configuration example when state monitoring and health check are performed using a state monitoring and controlling monitor when a sensor terminal is stored in a data collection and charging device.

In Embodiment 6, monitoring the state of a sensor terminal and checking of the health of the sensor terminal when implementing Embodiments 1 to 5 will be described. FIG. 19 illustrates a configuration example when a sensor terminal is stored in the data collection and charging device and the state of the sensor terminal is monitored and the health of the sensor terminal is checked using the state monitoring and controlling monitor. Since the vibration data acquired in the field is stored in a sensor terminal 1900, the data is collected by a collection and charging device 1901. At the same time, the battery in the sensor terminal 1900 is automatically charged just by storing the sensor terminal in the data collection and charging device. In this case, the remaining battery power and the data transmission state are always monitored by the microcomputer 301 and the communication microcomputer 306. A notification of completion of data transmission and a notification of completion of charging are sent to a state monitoring and controlling monitor 1903 using a wireless control interface 3012 in the sensor terminal. The notifications may be sent using an LED or the like disposed in the collection and charging device. However, this method is not suitable when a large number of (approximately one hundred thousand) terminals are installed.

Moreover, failures and defects may occur due to a long-term operation of the sensor terminal. Therefore, when the sensor terminal is stored in the data collection and charging device, the health of basic functions is checked. Specifically, when a reference vibration generation device 1902 is disposed in the collection and charging device 1901 as in FIG. 19 and the sensor terminal performs data transmission and charging, the sensor unit in the sensor terminal 1900 detects a vibration of the reference signal generation device 1902 and the state monitoring and controlling monitor 1903 monitors data. In this way, failures and defects of the sensor unit are checked. Moreover, the values obtained by the GPS 303, the inclination sensor 302, the thermometer 3010, and the illuminometer 3011 are acquired to check failures and defects. The values obtained by the GPS 303 and the thermometer 3010 may be compared with the values obtained by a checking thermometer 1904 and a checking GPS 1905 as in FIG. 19.

<Sensor Terminal State Transition Flow>

Figure 20:
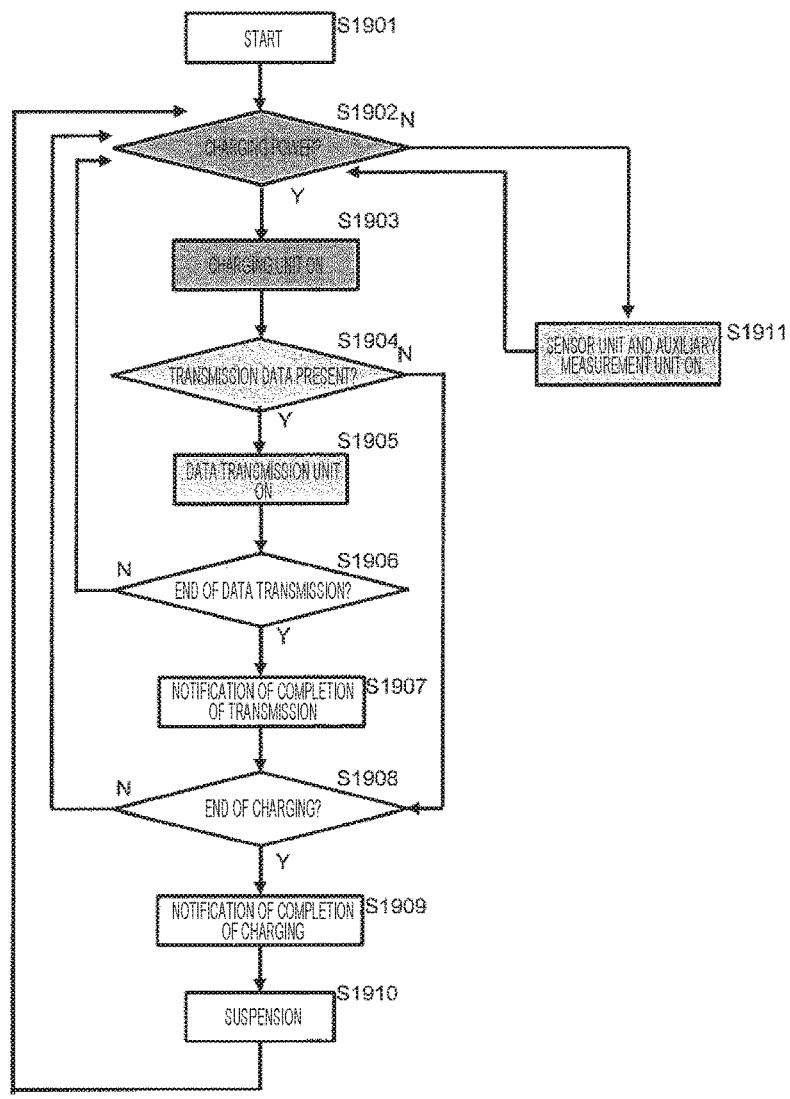
FIG. 20 is a diagram illustrating a state transition flow of a sensor terminal when state monitoring and health check are performed using a state monitoring and controlling monitor when the sensor terminal is stored in a data collection and charging device.

FIG. 20 illustrates the state transition flow of the sensor terminal according to the present embodiment. When measurement of vibrations is completed in the field and the sensor terminal is stored in the data collection and charging device, since charging power is supplied, the flow proceeds to S1903. The subsequent processes are described in Embodiments 1 to 5, and a notification of completion of data transmission and a notification of completion of charging are sent in S1907 and S1909. In this way, the notifications of completion are sent using the wireless control interface 3012 in the sensor terminal. In this flow, even after the vibration data is acquired in the field and the sensor terminal is stored in the data collection and charging device, since the sensor unit and the auxiliary measurement unit remain in the ON state, the above-described health checking can be executed.

Embodiment 7

According to an embodiment of the present invention, when the acquired vibration data is stored in the memory in the sensor terminal, the vibration data may be corrected by the microcomputer 301 using the temperature measurement value obtained by the thermometer 3010 and the inclination measurement value obtained by the inclination sensor 302 and the corrected vibration data may be stored in the memory 305. A vibration data correction algorithm based on the temperature characteristic data and the inclination of the sensor unit is installed in the microcomputer 301 and the memory 305 as correction reference data.

Embodiment 8

In Embodiment 8, a method of transmitting an alarm to the control center S when failures and defects occur in the sensor terminal or the remaining battery power of the sensor terminal is low during operation of the large-scale sensor network in the field will be described.

A terminal in which failures or functional defects occur or of which the remaining battery power is low continuously transmits an alarm. Since the alarm is transmitted to the control center S in a short time when the alarm is transmitted to a terminal located close to the control center S, a terminal layout (a terminal layout diagram and a terminal address list) is stored in advance in the memory 305 in the terminal. The next alarm transmission destination is determined by referring to the terminal layout diagram so that the alarm is sent through a shortest multi-hop route to the control center S. When the same is performed for all sensor terminals, alarm information (a defect occurring terminal ID and a defect state) can be transmitted to the control center through a shortest route.

Figure 22:
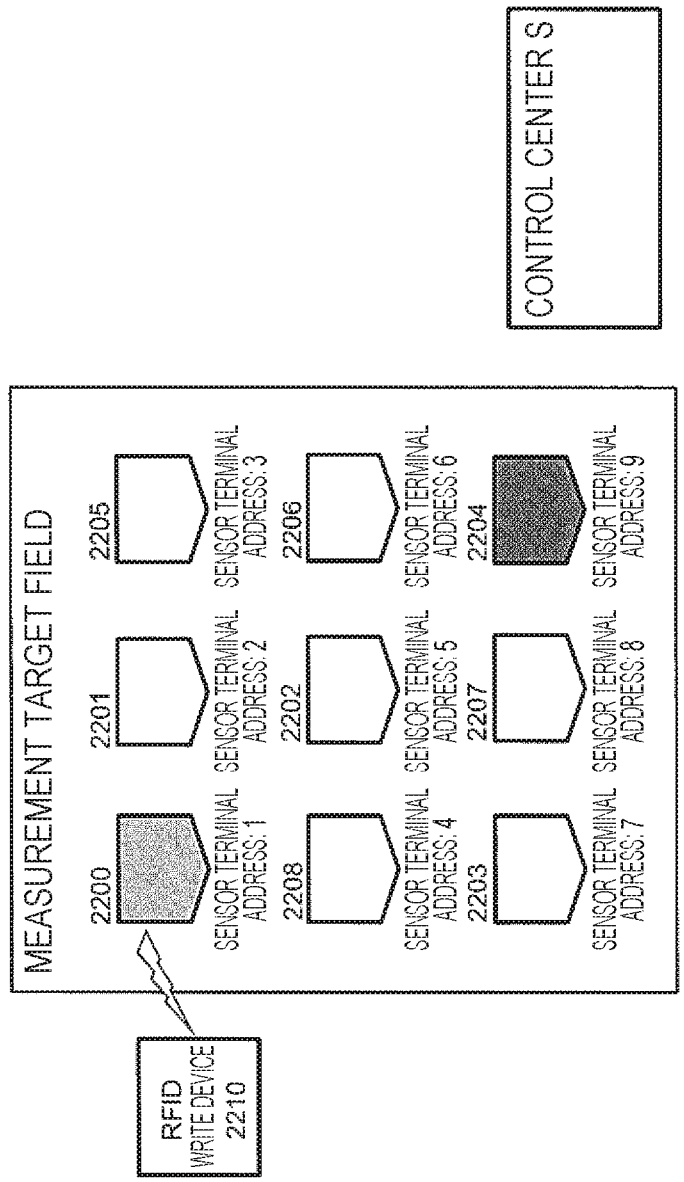
FIG. 22 is a diagram illustrating an example of a field installation state after an RFID for notifying a control center of an alarm writes addresses when the remaining battery power of a sensor terminal of a sensor network is low or an operation defect occurs in a large-scale sensor network system of the present invention.

However, it takes a large number of steps to arrange one hundred thousand sensor terminals or more of which the IDs and addresses are described in the memory 305 according to the terminal layout diagram when an operator finds a sensor terminal to be disposed at a certain place. As a result, the sensor terminals are disposed randomly as compared to the address layout described in a terminal layout diagram 2110 as illustrated in FIG. 21. Therefore, after sensor terminals are installed randomly as in FIG. 22, the address as described in the layout diagram is written to the memory 305 by a non-contact communication device such as an RFID write device 2210 or the like with the aid of an RFID interface 3016 of the sensor terminal with reference to the planned terminal layout diagram 2110. In this way, the same layout as the terminal layout diagram 2110 can be realized with a small number of steps.

(Others)

The present invention can also be realized by a program code of software that implements the function of the embodiment. In such a case, a storage medium having recorded thereon the program code is provided to a system or a device, and a computer (or a CPU or a MPU) in the system or the device reads the program code stored in the storage medium.

In this case, the program code itself read from the storage medium implements the function of the aforementioned embodiment, and the program code itself and the storage medium having stored thereon the program code constitute the present invention. As the storage medium for providing such a program code, for example, a flexible disk, CD-ROM, DVD-ROM, a hard disk, an optical disc, a magneto-optical disk, CD-R, a magnetic tape, a nonvolatile memory card, ROM, or the like is used.

Further, based on an instruction of the program code, an OS (operating system) running on the computer or the like may perform some or all of actual processes, and the function of the aforementioned embodiment may be implemented by those processes. Furthermore, after the program code read from the storage medium is written to the memory in the computer, the CPU or the like of the computer may, based on the instruction of the program code, perform some or all of the actual processes, and the function of the aforementioned embodiment may be implemented by those processes.

Moreover, the program code of the software that implements the function of the embodiment may be distributed via a network, and thereby stored in storage means such as the hard disk or the memory in the system or the device, or the storage medium such as CD-RW or CD-R, and at the point of use, the computer (or the CPU or the MPU) in the system or the device may read the program code stored in the storage means or the storage medium and execute the program code.

Finally, it should be appreciated that the process and technology described herein may be implemented substantially by any combination of components without being related to any specific device. Further, various types of general-purpose devices can be used in accordance with the teaching described herein. It may be found to be advantageous to construct a dedicated device to execute the steps of the method described herein. In addition, various inventions can be formed by combining a plurality of components disclosed in the embodiment as appropriate.

For example, some components may be removed from the whole components shown in the embodiment. Further, the components in different embodiments may be appropriately combined. Although the present invention has been described with reference to specific examples, such examples are shown not for limiting purposes but for description purposes in all aspects. Those skilled in the art may appreciate that there are a number of combinations of hardware, software, and firmware that are suitable for implementing the present invention. For example, the software described herein maybe implemented by an assembler or a wide range of programs or script languages such as C/C++, perl, Shell, PHP, or Java (registered trademark).

Further, in the aforementioned embodiment, the control lines and information lines represent those that are considered to be necessary for description purposes, and do not necessarily represent all control lines and information lines that are necessary for a product. In practice, all structures may be mutually connected.

In addition, those skilled in the art may appreciate that other implementations of the present invention are apparent from consideration of the specification and the embodiment of the present invention disclosed herein. Various configurations and/or components of the embodiment described herein can he used either alone or in any combination in a computerized storage system having a data management function.

Reference Signs List f measurement target field
d data collection and charging facility
1s, 2s, . . . , is, (i+1)s, js, . . . , 10000s, 200, 1900, 2100 to 2108, 2200 to 2208 sensor terminal
1c, 2c, . . . , ic, (i+1) c, jc, . . . , 10000c, 201, 1901 collection and charging device
G, G1, G2 vibration generation source (earthquake simulation vehicle)
S control center
sv server
B radio base station
P power supply
L communication cable
C power cable
202, 1903 state monitoring and controlling monitor
301 microcomputer
302 inclination sensor
303, 1905 GPS
304 sensor
305 memory
306 communication microcomputer
307 wireless data
308 battery
309 power feeding circuit
3010, 1904 thermometer
3011 illuminometer
3012 wireless control
3013 timer
3014, 3015 antenna
3016 RFID
401 charge control microcomputer
402 power feeding circuit
403 power supply circuit
404 communication microcomputer
405 wireless data
406 antenna
700, 703, 800, 803, 806, 900, 903, 906 control signal
701, 704, 801, 804, 901, 904 response (end of vibration)
702, 802, 805, 902, 905 response (completion of preparation of movement and earthquake simulation)
710, 712, 810, 812, 910, 912 vibration
711, 713, 811, 813, 911, 913 movement
714, 717, 814, 817, 820, 914, 917 activation
715, 718, 815, 818, 915, 918 measurement
716, 719, 816, 819, 916 suspension
720, 821, 921 timing
822, 919 response (end of vibration) failure in interception
823 failure in interception of control signal
1601, 1602, 1701, 1702 determination range
1603 determination region
1800, 1810 reception standby
1801, 1811 command packet
1802, 1812 pause (reception standby)
1803, 1813 command reception
1804, 1806, 1814, 1816 Ack
1805, 1817 data transmission
1815 receive
1902 reference vibration generation device
2110 terminal layout diagram
2210 RFID write device
Sxxxx state transition flow sequence

The invention claimed is:

1. A sensor network system comprising:
a plurality of data storage-type wireless sensor terminals each comprising a first sensor, a memory, and a wireless data transmitter;
a plurality of wireless data collection and charging devices each constructed to receive one of said data storage-type wireless sensor terminals; the wireless data collection and charging devices each include a reference signal device used to detect functional defects or failures of a received data storage-type wireless sensor terminal, and
a server coupled to the plurality of wireless data collection and charging devices,
wherein the data collection and charging device is configured to charge the data storage-type wireless sensor terminal and to receive acquired sensor data from the data storage-type wireless sensor terminal via the wireless data transmitter,
wherein each said data storage-type wireless sensor terminal is configured to
turn off a data transmission process when a charging operation of the wireless data collection and charging device is turned off as indicated by an activation signal;
acquire the sensor data using the first sensor and record the acquired sensor data in the memory;
turn off the first sensor when the charging operation of the wireless data collection and charging device is turned on; and
automatically switch transmission of the acquired sensor data in the memory to and between the data collection device and the server, and
wherein said charging of the data storage-type wireless sensor terminal and transmission of the acquired sensor data via the wireless transmitter are automatically executed in a switched manner based on whether the terminal is charged or not.

2. The sensor network system according to claim 1, wherein
the wireless data Storage-type sensor terminal further comprises an auxiliary measurement device which includes a Global Positioning System (GPS) module and a thermometer,
the data collection and charging device further comprises a reference signal generator,
after the wireless data storage-type sensor terminal has operated in the field for a predetermined period or longer, in parallel with execution of charging of the wireless sensor terminal and wireless transmission of the data acquired by the wireless data storage-type sensor terminal during the charging operation of the terminal,
the reference signal generator supplies a reference signal to the wireless data storage-type sensor terminal which causes the wireless data storage-type sensor terminal to wirelessly output a value of the first sensor to an external monitor device via wireless control, and a measurement result of the GPS module and a measurement result of the auxiliary measurement device are wirelessly output simultaneously, and a health after the operation of the wireless data storage-type sensor terminal is checked.

3. The sensor network system according to claim 1, wherein the plurality of wireless data storage-type sensor terminals are arranged to form a large scale wireless sensor array (several tens of thousands or more sensors) configured to acquire a signal from a vibration generation source controlled by a control,
the first sensor is activated by the occurrence of an event which occurs earlier among one of intercepting by the data storage-type wireless sensor terminal a control signal for issuing a plurality of types of instructions including a timing at which a signal is transmitted from the control center to the vibration generation source via wireless communication; and
an end of a countdown of a counter in an activation timer included in the wireless data storage-type terminal when the charging operation is turned off, and
the sensor is suspended when the wireless sensor terminal intercepts a response signal indicating the completion of vibration from the vibration generation source to the control center via wireless communication.

4. The sensor network system according to claim 1, wherein
the wireless data storage-type sensor terminal activates the first sensor by wireless control of an external wireless control device.

5. The sensor network system according to claim 1, wherein the sensor network system acquires a signal from a vibration generation source using a large-scale sensor array (several tens of thousands or more sensors) formed using said plurality of wireless data storage-type terminals, and
a signal of a predetermined specific signal pattern is transmitted from the vibration generation source, and the wireless data storage-type sensor terminal checks reception of the signal of the specific signal pattern using a second sensor and activates the first sensor based on the specific signal pattern.

6. The sensor network system according to claim 1, wherein
the wireless data storage-type sensor terminal checks reception of a signal having a signal intensity equal to or higher than a predetermined threshold using a second sensor and activates the first sensor based on said signal intensity.

7. The sensor network system according to claim 1, wherein the sensor network system comprises a large-scale sensor network system (several tens of thousands or more sensors) formed using the plurality of wireless data storage-type sensor terminals configured to acquire a signal from a vibration generation source that generates a vibration wave, the large-scale sensor array being installed on an earth surface,
the wireless data storage-type sensor terminal receives a vibration from the vibration generation source using a second sensor capable of measuring three-axis coordinate components, and
reception of an initial vibration from the vibration generation source having directivity is checked and the first sensor is activated based on the initial vibration.

8. The sensor network system according to claim 1, wherein
the wireless data storage-type sensor terminal further comprise an illuminometer, and
when the illuminometer detects an illuminance equal to or higher than a predetermined threshold, the wireless data storage-type sensor terminal determines that the wireless data storage-type sensor terminal is buried in a field and the first sensor is activated.

9. The sensor network system according to claim 1, wherein
the wireless data storage-type sensor terminal further comprises a Global Positioning System (GPS) module, and
when the GPS module obtains latitude and longitude values that continuously fall within a predetermined range for a predetermined period, the wireless data storage-type sensor terminal determines that the wireless data storage-type sensor terminal is installed on a field and the first sensor is activated.

10. The sensor network system according to claim 1, wherein
the wireless data storage-type sensor terminal further comprises a thermometer and
when the thermometer measures a range of temperature values that deviates from a predetermined range for a predetermined period, the wireless data storage-type sensor terminal determines that the wireless data storage-type sensor terminal is installed on a sensing target field or has arrived at the field, and the first sensor is activated.

11. The sensor network system according to claim 1, wherein
the plurality of wireless data storage-type sensor terminals are arranged to form a large-scale wireless sensor array (several tens of thousands or more sensors) configured to acquire a signal from a vibration generation source controlled by a control center,
the first sensor is activated by the occurrence of an event which occurs earlier among one of
intercepting, by the wireless data storage-type sensor terminal, a control signal for issuing a plurality of types of instructions including a timing at which a signal is transmitted from the control center to the vibration generation source via wireless communication; and
an end of a countdown of a counter in an activation timer included in the wireless data storage-type sensor terminal when the charging operation is turned off, and
the sensor is suspended by the occurrence of an event which occurs earlier among one of
intercepting, by the wireless data storage-type sensor terminal, a response signal indicating completion of vibration from the vibration generation source to the control center via wireless communication; and
an end of a countdown of a counter of a suspension timer included in the wireless data storage-type sensor terminal.

12. The sensor network system according to claim 11, wherein
when the control center, the vibration generation source, and an external wireless control device transmit a communication request command packet continuously or intermittently, the wireless data storage-type sensor terminal performs a standby operation to receive wireless packets for a predetermined period or longer during activation based on intermittent driving of a predetermined cycle to reduce power consumption, and
during said standby operation, wireless control communication is performed among the control center, the vibration generation source, the external wireless control device, and the wireless data storage-type sensor terminal.

13. The sensor network system according to claim 1, wherein
- the wireless data storage-type sensor terminal further comprises a Radio Frequency Identification (RFID) write device, and
- the wireless data storage-type sensor terminal is configured to write into memory, after or during installation of the wireless data storage-type sensor terminal in the field, using a wireless communication function of the RFID write device, address information in each wireless data storage-type sensor terminal according to a network address also stored in the memory of the wireless data storage-type sensor terminal, said address information comprising predetermined terminal layout information for notifying a control center of information including one or more of a low power state of a battery included in the data storage-type sensor terminal, an occurrence of defects, or failures during operation of the data storage-type sensor terminal.

* * * * *